United States Patent
Fukuyama et al.

(10) Patent No.: US 7,061,902 B1
(45) Date of Patent: Jun. 13, 2006

(54) TELEPHONE COMMUNICATION SYSTEM AND METHOD FOR CONTROLLING THE TELEPHONE COMMUNICATION SYSTEM

(75) Inventors: Noriyuki Fukuyama, Kawasaki (JP); Masanobu Morinaga, Kawasaki (JP); Masahiro Matsuda, Kawasaki (JP); Yoshiaki Inoue, Kawasaki (JP); Yasutaka Iwasaki, Kawasaki (JP); Tomoyoshi Takebayashi, Kawasaki (JP); Ikuro Hibino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/520,810

(22) Filed: Mar. 8, 2000

(30) Foreign Application Priority Data

Mar. 19, 1999 (JP) ................................. 11-075344
Feb. 17, 2000 (JP) ............................. 2000-040249

(51) Int. Cl.
*H04L 12/66* (2006.01)
(52) U.S. Cl. ..................................... 370/352; 370/410
(58) Field of Classification Search ................ 370/260, 370/261, 262, 271, 352, 353, 356, 389, 419, 370/420, 463, 493; 379/1.02, 32.01, 41, 379/68, 69, 70, 85, 88.08, 88.13, 88.17, 88.19, 379/88.22, 88.23, 142.05, 142.06, 201.1, 379/202.01, 207.02, 211.01
See application file for complete search history.

(56) References Cited

U.S. PATENT DOCUMENTS 5,524,194 A * 6/1996 Chida et al. ........... 375/240.04
5,764,731 A * 6/1998 Yablon ..................... 379/88.15
5,903,734 A * 5/1999 Chida ......................... 709/232
6,046,762 A * 4/2000 Sonesh et al. .......... 379/265.01
6,128,285 A * 10/2000 Buhler et al. ............... 370/242
6,359,892 B1 * 3/2002 Szlam ........................ 370/401
6,404,741 B1 * 6/2002 Buhler et al. ............... 370/244
2002/0004802 A1 * 1/2002 Shima ........................ 707/513
2002/0012353 A1 * 1/2002 Gerszberg et al. .......... 370/419
2002/0044199 A1 * 4/2002 Barzebar et al. .......... 379/93.17
2002/0075855 A1 * 6/2002 Bruno et al. ................ 370/352
2002/0181398 A1 * 12/2002 Szlam ........................ 370/230

* cited by examiner

*Primary Examiner*—Chi Pham
*Assistant Examiner*—Anh-Vu Ly
(74) *Attorney, Agent, or Firm*—Staas & Halsey LLP

(57) ABSTRACT

A telephone set and an information terminal are connected by a packet switched network. The information terminal has a control target list in which a predetermined telephone set information is stored, and a terminal controller. The terminal controller generates, based on an instruction from a user, a control command in which an instruction related to multimedia phone communication is recorded, and sends that command to the predetermined telephone set. The predetermined telephone set has a terminal list storing information about the information terminal, and a telephone controller. The telephone controller generates, based on the control command received from the information terminal, a call control command for performing multimedia phone communication with another telephone set on the packet switched network, and sends that command to the other telephone set.

31 Claims, 36 Drawing Sheets

Fig. 3

TERMINAL TABLE

| TERMINAL | IP ADDRESS | USER NAME | PERSONAL INDENTIFICATION NAMBER |
|---|---|---|---|
| C1 | 10.254.211.10 | user-A | 007 |

Fig. 4

MESSAGES TABLE

| CALLING PARTY IP ADDRESS | CALLING PARTY NAME | MESSAGE |
|---|---|---|
| 10.254.211.14 | Taro Fujitsu | Since I am out of the office on a business trip today,⋯ |
| ⋮ | ⋮ | |

Fig. 5

FORWARDING DESTINATION TABLE

| CALLING PARTY IP ADDRESS | CALLING PARTY INFORMATION* | TIME | FORWARDING DESTINATION ADDRESS | FORWARDING DESTINATION INFORMATION |
|---|---|---|---|---|
| 10.254.211.18 | Goemon Fujitsu | 17:00-8:00 | 10.254.211.12 | President' Office (Tokyo) |
| 10.254.211.16 | Saburo Fujitsu | | 10.254.211.13 | Vice President's Office (Osaka) |
| ⋮ | ⋮ | ⋮ | | |

Fig. 7A
MANAGEMENT TABLE

| C1 | | | |
|---|---|---|---|
| T1 | On the desk | 10.254.211.11 | Buttons 1,2,3,Display |
| T2 | President's Office (Tokyo) | 10.254.211.12 | Buttons 1,2,3,Display |
| T3 | Vice President's Office(Osaka) | 10.254.211.13 | Buttons 1,2,3,Display |

Fig. 7B
USER STATE TABLE

| C1 | | |
|---|---|---|
| T1 | On the desk | Absent |
| T2 | President's Office (Tokyo) | Present |
| T3 | Vice President's Office(Osaka) | Present |

Fig. 7C
COMMUNICATION STATE TABLE

| C1 | | |
|---|---|---|
| T1 | On the desk | Free |
| T2 | President's Office (Tokyo) | Connection in Progress |
| T3 | Vice President's Office(Osaka) | Free |

Fig. 7D
AUTHENTICATION INFORMATION TABLE

| USER NAME | PERSONAL INDENTIFICATION NUMBER |
|---|---|
| user−A | 007 |

Fig. 7E
INCOMING CALLS REJECTION TABLE

| CALLING PARTY | MESSAGE |
|---|---|
| Saburo Fujitsu | The telephone number has changed······ |
| Jiro Fujitsu | This telephone number is presently······ |

FLOW OF PROCESSING PERFORMED BY TELEPHONE SET

FLOW OF PROCESSING PERFORMED BY CONTROL APPARATUS

MONITORING PROCESSING

FLOW OF PROCESSING PERFORMED BY CONTROL APPARATUS

CONTROL PROCESSING

EXAMPLE OF STATE NOTIFICATION WINDOW

CONTROL COMMAND(REPORT)

| COMMAND TYPE | REQUESTING PARTY ADDRESS | CALL INDENTIFIER | CALLED PARTY ADDRESS | CALLING PARTY ADDRESS | COMMUNICATION STATE TYPE | RESULT | DETALL |
|---|---|---|---|---|---|---|---|

EXAMPLE OF STATE NOTIFICATION IN ACCORDANCE WITH USER STATE

MAIN MENU

CONNECTION WINDOW

EXAMPLE OF CONTROL COMMAND (CONNECTION REQUEST)

| COMMAND TYPE | CALL INDENTIFIER | CONNECTION DESTINATION ADDRESS | REQUESTING PARTY ADDRESS | RESULT | DETAIL |
|---|---|---|---|---|---|

Fig. 21

EXAMPLE OF CONTROL COMMAND
(RETRIEVE RECORDED MESSAGES LIST)

| COMMAND TYPE | REQUESTING PARTY ADDRESS | RESULT | DETAIL |
|---|---|---|---|

Fig. 22

EXAMPLE OF CONTROL COMMAND
(RECORDED MESSAGES LIST)

| COMMAND TYPE | REQUESTING PARTY ADDRESS | NUMBER OF RECORDED MESSAGES |
|---|---|---|

ONE FOR EACH MESSAGE {

| MESSAGE NO. | RECORDING START TIME | RECORDING TIME | CALLING PARTY ADDRESS | CALLER INFORMATION |
|---|---|---|---|---|

| MESSAGE NO. | RECORDING START TIME | RECORDING TIME | CALLING PARTY ADDRESS | CALLER INFORMATION |
|---|---|---|---|---|

| RESULT | DETAIL |
|---|---|

Fig. 23

EXAMPLE OF CONTROL COMMAND
(RETRIEVE RECORDED MESSAGE)

| COMMAND TYPE | REQUESTING PARTY ADDRESS | MESSAGE NO. | RESULT | DETAIL |
|---|---|---|---|---|

Fig. 24

EXAMPLE OF CONTROL COMMAND
(RETRIEVE RECORDED MESSAGE)

| COMMAND TYPE | REQUESTING PARTY ADDRESS | CODING TYPE | MESSAGE LENGTH |
|---|---|---|---|

MESSAGE(VOICE DATA)

| RESULT | DETAIL |
|---|---|

SET FORWARDING DESTINATION WINDOW

Fig. 27

EXAMPLE OF CONTROL COMMAND(SET/CANCEL FORWARDING)

| COMMAND TYPE | SET FUNCTION TYPE | SET FLAG |
|---|---|---|

| REQUESTING PARTY ADDRESS | FORWARDING DESTINATION ADDRESS | FORWARDING DESTINATION INFORMATION |
|---|---|---|

| RESULT | DETAIL |
|---|---|

Fig. 30

EXAMPLE OF CONTROL COMMAND (RETRIEVE COMMUNICATION LOG)

| COMMAND TYPE | REQUESTING PARTY ADDRESS | OUTGOING/ INCOMING FLAG | RESULT | DETAIL |
|---|---|---|---|---|

Fig. 31

EXAMPLE OF CONTROL COMMAND (COMMUNICATION LOG)

| COMMAND TYPE | REQUESTING PARTY ADDRESS | NUMBER OF OUTGOING/ INCOMING CALLS IN LIST |
|---|---|---|

ONE FOR EACH OUTGOING/ INCOMING CALL

| COMMUNICATION NO. | OUTGOING/ INCOMING FLAG | SUCCESS FLAG | OUTGOING/ INCOMING TIME | SPEAKING TIME | CONNECTION DESTINATION ADDRESS | OPPOSITE PARTY INFORMATION |
|---|---|---|---|---|---|---|

| COMMUNICATION NO. | OUTGOING/ INCOMING FLAG | SUCCESS FLAG | OUTGOING/ INCOMING TIME | SPEAKING TIME | CONNECTION DESTINATION ADDRESS | OPPOSITE PARTY INFORMATION |
|---|---|---|---|---|---|---|

| RESULT | DETAIL |
|---|---|

FLOW OF COMMUNICATION LOG ACQUISITION PROCESSING

Fig. 35

EXAMPLE OF CONTROL COMMAND(SET)

| COMMAND TYPE | SET FUNCTION TYPE | SET FLAG | REQUESTING PARTY ADDRESS |
|---|---|---|---|

| BUTTON IDENTIFIER | DISPLAY COLOR TYPE | DISPLAY PATTERN | CHARACTER LENGTH | DISPLAY CHARECTER DATA |
|---|---|---|---|---|

| RESULT | DETAIL |
|---|---|

Fig. 36

EXAMPLE OF CONTROL COMMAND
(INPUT INFORMATION)

| COMMAND TYPE | REQUESTING PARTY ADDRESS | INPUT DEVICE TYPE | RESULT | DETAIL |
|---|---|---|---|---|

Fig. 37
Connection request
Forward
Hold
Recorded message list
Set forwarding destination ▶
Communication log ▶
Set ▶
Volume
Create outgoing message ▶
Reject incoming calls/cancel rejection▶
SET VOLUME WINDOW
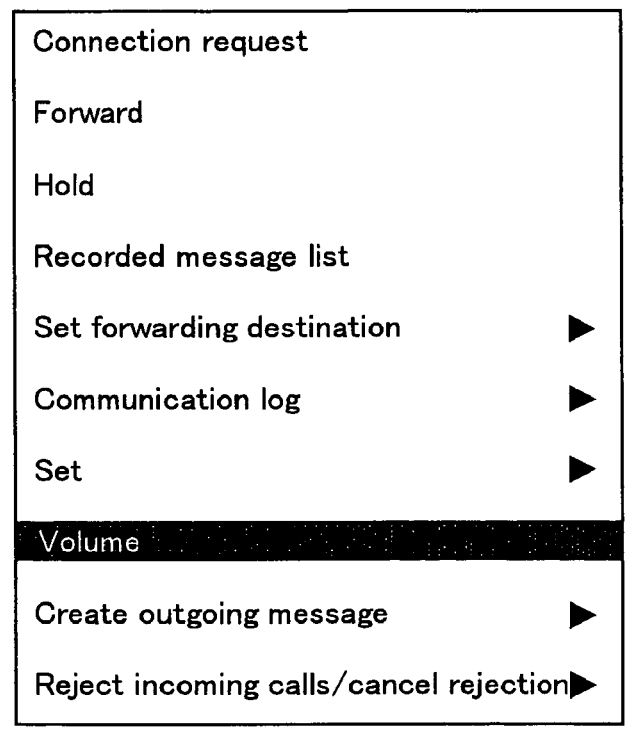

Fig. 38

EXAMPLE OF CONTROL COMMAND
(SET SOUND)

| COMMAND TYPE | SET FUNCTION TYPE | SET FLAG | REQUESTING PARTY ADDRESS |
|---|---|---|---|

| SET VOLUME | CODING TYPE | TONE LENGTH | TONE DATA |
|---|---|---|---|

| RESULT | DETAIL |
|---|---|

CREATE OUTGOING MESSAGE WINDOW

Fig. 40

EXAMPLE OF CONTROL COMMAND
(CREATE MESSAGE)

| COMMAND TYPE | SET FUNCTION TYPE | SET FLAG | REQUESTING PARTY ADDRESS | CALLING PARTY ADDRESS |
|---|---|---|---|---|

| CODING TYPE | MESSAGE LENGTH | MESSAGE DATA |
|---|---|---|

| RESULT | DETAIL |
|---|---|

Fig. 42

| Connection request |   |
|---|---|
| Forward |   |
| Hold |   |
| Pick up |   |
| Recorded messages list | ▶ |
| Set forwarding destination | ▶ |
| Communication log | ▶ |
| Set | ▶ |
| Volume |   |
| Create outgoing message | ▶ |
| Reject incoming calls/cancel rejection ▶ | On the desk |
|   | President's Office(Tokyo) |
|   | Vice President's Office(Osaka) |

REJECT INCOMING CALLS/
REJECTION WINDOW

⇩

TARGET:Telephone on the desk

| SELECTION OF CALLING PARTY | CALLING PARTY |
|---|---|
| All | |
| Jiro Fujitsu | This telephone number is presently not in use. |
| ⋮ | The telephone number has changed. The new number is ⋯ |

Add

| SET LIST ||
|---|---|
| CALLING PARTY | SELECTION OF MESSAGE |
| Saburo Fujitsu | The telephone number has changed. The new telephone number is⋯ |
| Jiro Fujitsu | This telephone number is presently not in use. |
|  |  |

Delete    OK    Cancel

EXAMPLE OF CONTROL COMMAND
(REJECTION OF INCOMING CALLS AND
CANCELLATION OF REJECTION)

OPERATION PANEL WINDOW

EXAMPLE OF CONTROL COMMAND
(REPORT INPUT DEVICES)

EXAMPLE OF CONTROL COMMAND
(COMMUNICATION STATE NOTIFICATION)

Fig. 49

EXAMPLE OF CONTROL COMMAND(INPUT)

| COMMAND TYPE | REQUESTING PARTY ADDRESS | INPUT NO. | INPUT DEVICE TYPE | RESULT | DETAIL |
|---|---|---|---|---|---|

(SEVERAL INPUT DEVICE TYPES MAY BE INCLUDED)

TELEPHONE COMMUNICATION SYSTEM AND METHOD FOR CONTROLLING THE TELEPHONE COMMUNICATION SYSTEM

BACKGROUND OF THE INVENTION

A. Field of the Invention

The present invention relates to technology for data communications on a packet switched network. More specifically, the present invention relates to a technology for controlling a phone terminal on a packet switched network, such as a LAN or the Internet, remotely from an information terminal.

B. Definition of Terms

In the present invention, the term "information terminal" refers to an apparatus that can communicate on a packet switched network regardless of whether or not the information terminal has phone terminal capabilities. Examples of an information terminal include, for instance, a PC (Personal Computer) or a workstation.

The term "communication" refers to audio data and/or visual data and the like. The aforementioned phone terminal capability includes data input and output, and transmission and reception of put and output media (i.e., multimedia) data on a packet switched network.

The term "phone terminal" refers to an apparatus having the aforementioned communication capability (i.e., a multimedia packet-switched phone). The phone terminal may be a dedicated terminal for communication, such as a LAN telephone, audio only telephone or an audio/visual telephone. Alternatively, the phone terminal may be an information terminal having a microphone and speaker (and camera) and corresponding hardware and/or software, such that the information terminal may serve as a phone terminal.

The term "state detection apparatus" broadly refers to an apparatus that detects the user state of a phone terminal. It includes, for example, an automatic message recording button provided on a phone terminal, for instance, telephone set having a message recording device. An additional example includes: an apparatus wherein the user state is detectable based on the operation state of the phone terminal; the activation state of a screen saver (if the phone terminal is an information terminal with phone terminal capabilities); the, input state with respect to an application currently operating on the phone terminal; information in a schedule database created by the user; and the like. The user state broadly includes the user's whereabouts, whether the user is busy, or using the phone terminal, for instance, currently engaged in a telephone conversation, and the like.

C. Description of Related Art

Various configurations have been proposed in the past to control a telephone set from another apparatus. One example to connected to a LAN via an additional apparatus. An exchange and a control apparatus control the telephone set. The control apparatus controls the exchange via the additional apparatus, and thereby, the telephone set is controlled.

Additionally, there is also a configuration wherein the exchange and telephone are connected via a modem. In this configuration, the modem is controlled from a control apparatus and, for example, an outgoing call is switched to the telephone by the control apparatus after a telephone call is originated. Alternatively, the control apparatus may receive an incoming call and serve as an answering machine, playing a voice message and recording a message from the calling party.

Furthermore, in another configuration, a built-in circuit board in a control apparatus (such as a personal computer) is used as a telephone, and the built-in telephone is controlled by an internal bus of the personal computer. This configuration enables the control of outgoing telephone calls, the reporting of the phone number of incoming calls, and the like. In addition, it also enables the control of voice recording during a telephone call and storing that recording as a file, sending that recording as mail, and the like.

In addition, configurations have also been implemented wherein an answering telephone is remotely controlled from a separate a control apparatus connected to an exchange. In this configuration, a command transmitted by the control apparatus causes the answering telephone to play recorded message, and the response message can be modified. Furthermore, since a connection between the exchange and telephone is used in this configuration to control the telephone, the placement of the control apparatus is highly flexible.

Problems the Invention Attempts to Solve

The configuration wherein a telephone is controlled via the aforementioned LAN communication apparatus and exchange has the following problems. Namely: (1) the load is concentrated in the LAN communication apparatus; (2) functions that can be controlled are limited by the functions of the exchange; (3) the equipment is expensive since a LAN communication apparatus is needed; and (4) the control target is limited to a telephone under the control of the exchange.

The configuration wherein the aforementioned telephone and control apparatus are connected by a modem has the following problems. Namely: (1) the system configuration is not very flexible since the telephone and control apparatus are connected by a physical cable; (2) there are numerous limitations on commands for controlling a modem; and (3) there are cases in which control runs into problems when attempting to control the modem during use of the telephone or when trying to control the telephone while controlling the modem.

The configuration wherein the telephone set is a circuit board built into a computer has the following problems. Namely: (1) the computer cannot be used as a telephone unless the power is turned on; and 2) even in a configuration that has a separate power supply for the built-in circuit board, the placement of the control apparatus and the telephone is not very flexible since control cannot be effected from another computer.

The configuration wherein an answering telephone is remote controlled has the following problems. Namely: (1) since the cable that connects the answering telephone with the exchange or PSTN (Public Switched Telephone Network) is used to control outgoing calls and incoming calls cannot be controlled while the answering telephone is controlled by the control apparatus. In addition, the telephone cannot be controlled from the control apparatus when the telephone is in use.

There has been a strong trend in recent years toward the integration of data networks and voice networks. This trend uses VoIP (Voice over Internet Protocol), which is based on a technology that sends and receives voice data over a packet switched network. To send and receive voice data on a packet switched network, the inventors conceive of equipping a computer with an audio circuit board, and using it as a telephone in combination with software.

However, a beginner might find it difficult to use a telephone operated by a software application on a computer. In addition, computers themselves are not sufficiently reliable. Unfortunately for the beginner, it is supposed that telephone-type terminals (hereinafter referred to simply as telephone sets) that are directly connected to a data network, namely a packet switched network, and that can send and receive voice data will be widely used in the future in place of conventional telephones connected to an exchange.

SUMMARY OF THE INVENTION

On object of the present invention is to provide technology that uses a LAN telephone directly connected to a data network in order to facilitate the realization of services conventionally performed by the use of an additional apparatus, modem, built-in circuit board-type telephone set, and the like.

In accordance with one aspect of the present invention, a media communication control method used in a communication system includes a media terminal and an information terminal capable of communication on a packet switched network. The method includes the steps of:
- A: sending from the information terminal to the media terminal an instruction related to control of media terminal on the packet switched network, and
- B: controlling from the media terminal a media communication function and/or function of the media terminal on the packet switched network in accordance with the instruction related to control of media terminal from the information terminal.

Further, the media communication function on the packet switched network is a function for a media terminal to perform media communication with a second media terminal or an information terminal on the packet switched network. Control of media communication includes control of outgoing calls, control recorded messages and the like. Control of a media terminal includes turning on LED button lights, storing recorded messages, changing settings such as volume and the like.

In accordance with another aspect of the invention, a media communication control system includes a media terminal and an information terminal connected by a packet switched network. In this system, the information terminal has a first control means that generates, based on an instruction from a user, a control command wherein is recorded an instruction related to control of media terminal, and sends to the media terminal. Further, the media terminal has a second control means that performs, based on the control command received from the information terminal, control of a media communication function and/or media terminal function on the packet switched network. The same functional effect is obtained as above.

In accordance with another aspect of the present invention, a computer readable recording medium includes a communication control program stored thereon for use in an information terminal on a packet switched network. The program is configured to perform the following steps:
- A. A step for generating, based on an instruction from a user, a control command wherein is recorded an instruction related to control of media terminal; and
- B. A step for sending the control command to the media terminal on a packet switched network. The same functional effect is obtained as above.

In accordance with another aspect of the present invention, a computer readable recording medium includes a communication control program used in a media terminal on a packet switched network that executes the following steps:

- A. A step for receiving from information terminal on packet switched network a control command wherein is recorded an instruction related to control of media terminal; and
- B. A step that performs, based on the control command, control of media communication function and/or media terminal function on the packet switched network. The same functional effect is obtained as above.

In accordance with another aspect of the present invention, a media communication control method is used in a communication system that includes a phone terminal and an information terminal capable of communication on a packet switched network, wherein
- A: the information terminal sends to a predetermined phone terminal an instruction related to media communication on the packet switched network, and
- B: the phone terminal performs media communication with another phone terminal on the packet switched network in accordance with the instruction related to media communication from the predetermined information terminal.

The phone terminal receives from a predetermined information terminal an instruction related to, for example, call control. In accordance with the received instruction, processing is performed such as requesting a connection to another phone terminal. The information terminal sends the instruction to a predetermined phone terminal.

Preferably, the media communication control system includes a phone terminal and an information terminal connected by a packet switched network.

The information terminal includes a control target list wherein identification of a predetermined phone terminal is stored; and a first control means that generates, based on an instruction from a user, a control command wherein is recorded an instruction related to media communication, and sends the control command to the predetermined phone terminal.

The phone terminal has a terminal list wherein identification of a predetermined information terminal is stored; and a second control means that performs, based on the control command received from the predetermined information terminal, media communication with another phone terminal on the packet switched network.

The information terminal and phone terminal are connected to a packet switched network like a LAN or the Internet. The following considers the case wherein the media data is voice. The phone terminal is a voice terminal capable of voice input and output. The first control means generates, based on an instruction from the user, a control command wherein is recorded an instruction related to voice communication. Examples of instructions include requests related to call control, such as "CONNECT" "FORWARD", "HOLD" and "PICK UP". In addition, examples also include requests, such as "CREATE OUTGOING MESSAGE" and "SET FORWARDING DESTINATION". The generated control command is sent to a voice terminal on the packet switched network. Furthermore, the information terminal pre-stores in the control target list identification of a voice terminal that can send control commands.

The voice terminal receives a control command from the reception means. The second control means analyzes the received control command, and performs processing in accordance with the instruction of the control command. For example, if a control command is received that instructs "CONNECT" and the opposite party, the second control means generates a communication command that requests the connection. The second control means sends the generated communication command to the instructed opposite party. This communication command is generated in compliance with the protocol normally used in voice communication on a packet switched network. Furthermore, the voice terminal pre-stores in a terminal list identification of the information terminal that receives the control command.

In addition, if "CREATE ANSWERING MESSAGE" is instructed in addition to the specification of the calling party in the control command, the second control means stores the calling party and corresponding answering message. If there is a communication request from the stored calling party, the second control means creates a communication command that reports the answering message.

Preferably, the second control means of the phone terminal further generates a control command that reports the state of communication with another phone terminal on the packet switched network, and sends the control command to the information terminal.

For example, the second control means reports to the predetermined information terminal the communication state, such as "Incoming call," "Connection in progress," "Communication in progress" and "Disconnected." In addition to the communication state, it is also possible to report information that specifies the calling party phone terminal and the phone terminal on the receiving end, for example, information such as the name, IP address and installation location of the terminal.

Preferably, the phone terminal further has a storage means that stores predetermined data. In this system, the first control means of the information terminal further generates a control command that instructs the sending of data stored in the phone terminal. The second control means of the phone terminal acquires, based on the control command, the data from the storage means, further generates a control command that includes the data, and sends the control command to the information terminal.

Examples of data include communication log data stored in the voice terminal, and a recorded message from the calling party. The voice terminal sends to the information terminal specified data in accordance with the control command received from the information terminal.

Preferably, the information terminal further has an output means that outputs in accordance with the control command sent from the phone terminal.

If the information terminal receives a control command that, for example, reports the communication state, it displays the message, "There was an incoming call." In addition, if it receives a control command that reports the communication log, it displays on the display the communication log list, for example.

Preferably, the first control means of the information terminal further generates a control command that, in response to the control command sent from the phone terminal, instructs processing related to media communication.

The first control means, for example, generates a control command that instructs "Reject incoming call" if "Incoming call" is reported.

Preferably, the media communication control system is further provided with a state detection means that detects the state of the user. In this system, the first control means of the information terminal generates a control command that instructs predetermined processing in accordance with the detected user state.

The first control means, for example, instructs that the incoming call should be forwarded to the user destination if the user is absent. In addition, it displays a window that reports that there was a telephone call. An automatically recorded messages table for each opposite party is provided in the information terminal, and the message is reported in accordance with the opposite party if the user is absent.

Preferably, the phone terminal further has a storage means that stores predetermined data. In this system, the first control means of the information terminal further generates a control command that instructs data to be stored in the storage means, and the storage of that data. The second control means of the phone terminal stores the data in the storage means based on the control command.

Examples of data include an automatically recorded message that reports to the calling party if the user is absent. Other examples include the forwarding address, character data to be displayed on the display, and a button lighting pattern.

Preferably, the information terminal further has a processing specification means that receives a specification of predetermined processing related to media communication, and reports the specified processing to the first control means.

The processing specification means, for example, displays on the display of the information terminal a window for specifying predetermined processing. If some processing is specified by the user, the processing specification means reports the specification to the first control means.

Preferably, the information terminal further has a terminal specification means that receives the specification of a predetermined phone terminal stored in the control target list, and reports the specified phone terminal to the first control means.

For example, the terminal specification means displays on the display of the information terminal a window for specifying a predetermined voice terminal. If some voice terminal is selected by the user, the terminal specification means reports the specified voice terminal to the first control means.

Preferably, a plurality of phone terminals are stored in the control target list of the information terminal. One information terminal can control a plurality of phone terminals.

Additionally, identification of a plurality of information terminals may be stored in the terminal list of the phone terminal. The plurality of information terminals share and control a phone terminal. For example, if a plurality of users share a phone terminal, a determination can be made as to who should take the call, based on the calling party displayed on the information terminal.

Alternatively, identification of a plurality of information terminals are stored in the terminal list of the phone terminal, and the second control means performs the media communication in accordance with the first received control command among the control commands sent from the information terminal in response to the reporting of the communication state.

For example, if the voice terminal receives a communication request from a third party, it reports "Incoming call in progress" to the plurality of information terminals. The voice terminal processes the communication request in accordance with the control command sent earliest with respect to this report.

Preferably, identification of a plurality of information terminals and the priority of each information terminal is associated and stored in the terminal list of the phone terminal, and the second control means performs media communication in accordance with the command having the highest priority among control commands sent from the information terminal in response to the reporting of the communication state.

In the same manner as described above, the voice terminal receives a communication request from a third party and reports "Incoming call in progress" to the plurality of information terminals. The voice terminal stands by for a predetermined time for a control command with respect to the report, and generates a communication command in accordance with the control command having the highest priority among the received control commands.

Preferably, the storage means of the phone terminal stores automatically recorded message information related to an automatically recorded message from another phone terminal. In this system, the first control means of the information terminal generates, based on an instruction from the user, a control command that instructs the sending of the automatically recorded message information. The second control means of the phone terminal generates, based on the control command, a control command wherein is recorded the predetermined recorded message information. The output means of the information terminal outputs, based on a control command from the phone terminal, the automatically recorded message information.

For example, if a request for a recorded messages list is made from an information terminal to a voice terminal, a recorded messages summary list is sent.

Preferably, the storage means of the phone terminal stores a recorded message from another phone terminal. The first control means of the information terminal generates, based on an instruction from the user, a control command that instructs the specification and sending of the recorded message. The second control means of the phone terminal generates, based on the control command, a control command that includes the specified automatically recorded message. The output means of the information terminal outputs, based on the control command from the phone terminal, the recorded message.

For example, if one recorded message is selected from among the recorded messages list displayed on the display, the selected recorded message is reported to the voice terminal. The corresponding recorded message is sent from the voice terminal to the information terminal, and is then output by the information terminal's speaker and the like.

Preferably, the storage means of the phone terminal stores a recorded message from another phone terminal. The first control means of the information terminal generates, based on an instruction from the user, a control command that instructs the, specification and outputting of the recorded message. The second control means of the phone terminal outputs, based on the control command, the specified recorded message.

For example, if one recorded message is selected from the recorded messages list displayed on the display, the identifier of the selected recorded message is reported to the voice terminal. The corresponding recorded message is then output by the voice terminal's handset or speaker and the like.

Preferably, the storage means of the phone terminal stores a communication log. The first control means of the information terminal generates, based on an instruction from the user, a control command that instructs the sending of the communication log. The second control means of the phone terminal generates, based on the control command, a control command that includes the communication log. The output means of the information terminal outputs the communication log based on the control command from the phone terminal.

If the user specifies a voice terminal and specifies the referencing of a communication log, a control command that requests the sending of the communication log is sent to the specified voice terminal. The voice terminal generates, in accordance with the control command, a control command wherein is recorded predetermined information of the maintained communication log, and sends the generated control command to the information terminal.

Preferably, the first control means of the information terminal generates, based on an instruction from the user, a control command that instructs the setting of a message. In addition, the second control means of the phone terminal stores, based on the control command, the message in the storage means, and reports the message to another phone terminal in a predetermined case.

For example, the user specifies voice terminal A and the message "Presently in a meeting." The first control means reports the specified message to voice terminal A. Voice terminal A stores the message. In a predetermined case, for example if the ringer rings three times, voice terminal A retrieves the message and transmits the message to the opposite party. It may also be made possible to correlate and specify the message and calling party. The message corresponding to the calling party can be output.

Further, the first control means of the information terminal generates, based on an instruction from the user, a control command that instructs the setting of a forwarding destination. The second control means of the phone terminal stores, based on the control command, the forwarding destination in the storage means, and reports the forwarding destination to another phone terminal in a predetermined case.

For example, the user can set voice terminal B as the forwarding destination for voice terminal A. Voice terminal A analyzes the control command and stores voice terminal B. In a predetermined case, voice terminal A reports voice terminal B as the forwarding destination to the other voice terminal. Examples of predetermined cases include when the user is absent and when the forwarding destination is set.

Preferably, a display means is provided in the phone terminal, and the first control means of the information terminal generates, based on an instruction from the user, a control command that instructs the display means and a display pattern. The second control means of the phone terminal stores, based on the control command, the display pattern associated with the display means in the storage means, and displays the display pattern on the display means in a predetermined case.

Examples of a display means of the voice terminal include a display, a button and a lamp. Examples of a display pattern include a predetermined character message and turning on, flashing and turning off a button or lamp. For example, the user instructs voice terminal A to "Turn on" a lamp of the "Button 1." Voice terminal A stores the contents of this instruction. In a predetermined case, for example if an information terminal reports the reception of electronic mail, voice terminal A references the display table and "Turns on" the lamp of the "Button 1." Furthermore, the timing of the display can be appropriately set according to the needs of the user. For example, if an instruction is received from an information terminal, display can also be performed immediately.

Preferably, an input means is provided in the phone terminal, and the information terminal has a processing table that correlates and stores the input means of the phone terminal and the predetermined processing.

The second control means of the phone terminal generates a control command that reports the fact that an input to the input means has occurred. The first control means of the information terminal references the processing table based on the control command, and performs processing corresponding to the input means wherein the input occurred.

For example, the voice terminal reports to the information terminal that button 1 has been pressed. The first control means of the information terminal that receives this report executes the processing "Activate electronic mail apparatus" associated with "Button 1." In addition, if a number input by the voice terminal is reported, the information terminal displays the reported number.

Preferably, the information terminal of the phone terminal correlates authentication information corresponding to each information terminal, and stores the authentication information in a terminal list. The authentication information that corresponds to the information terminal itself or identification of the user of the information terminal is included in the control command sent from the information terminal to the phone terminal. The second control means of the phone terminal compares the authentication information included in the control command and the authentication information of the terminal list, and performs authentication processing of the information terminal.

For example, let us assume that voice terminal T is under the management of information terminal A. The user ID and personal identification number of information terminal A are stored in the terminal list of voice terminal T. Voice terminal T compares the user ID and personal identification number included in the control command with the user ID and personal identification number in the local terminal list; if they match, it determines that it is a control command from information terminal A. Conversely, the authentication information may be incorporated in the control command sent from the voice terminal, and the information terminal may perform authentication processing.

In accordance with another aspect of the present invention, a media communication control apparatus that is an information terminal on a packet switched network, has a control target list wherein is stored identification of a predetermined phone terminal on the packet switched network, and a first control means that generates, based on an instruction from the user, a control command wherein is recorded an instruction related to media communication, and sends the control command to the predetermined phone terminal.

The same functional effect is obtained as in the information terminal according to the above described invention.

In accordance with still another aspect of the present invention, a phone terminal on a packet switched network, has a terminal list wherein is stored identification of a predetermined information terminal on the packet switched network, and a second control means that receives from the predetermined information terminal a control command wherein is recorded an instruction related to media communication, and that performs, based on the control command, media communication with another phone terminal on the packet switched network.

The same functional effect is obtained as in the phone terminal according to the above described inventions.

In accordance with still another aspect of the present invention, there is a computer readable recording medium whereon is recorded a communication control program used in an information terminal on a packet switched network, wherein the communication control program is recorded for executing Steps A to C below:

A. Storing information relating to a predetermined phone terminal on the packet switched network;
B. Generating, based on an instruction from a user, a control command wherein is recorded an instruction related to media communication; and
C. Sending the control command to the predetermined phone terminal.

The same functional effect is obtained as in the information terminal according to the above described inventions. Examples of recording media include computer readable devices such a floppy disks, hard disk drives, semi-conductor memory modules, CD-ROM disks, DVDs and MOs.

In accordance with still another aspect of the present invention, there is a computer readable recording medium whereon is recorded a communication control program used in a phone terminal on a packet switched network, wherein the communication control program is recorded for executing Steps A to C below:

A. Storing a predetermined information terminal on the packet switched network;
B. Receiving from the predetermined information terminal a control command wherein is recorded an instruction related to media communication; and
C. Performing, based on the control command, media communication control, for example, on the packet switched network.

The same functional effect is obtained as in the phone terminal according to the above described inventions. Examples of recording media include computer readable devices such as floppy disks, hard disk drives, semi-conductor memory modules, CD-ROM disks, DVDs and MOs.

In accordance with still another aspect of the present invention, a transmitting medium may transmit the communication control program described above. Further, the transmitting medium includes communication mediums (optical fiber cable, wireless circuit, infrared rays, others) on a computer network (LAN, Internet, wireless communication network) system for transferring and providing program information as carrier wave.

In accordance with still another aspect of the present invention, a media communication control method used in a communication system includes a media terminal and an information terminal capable of communication on a packet switched network. In this method, the media terminal reports to the information terminal an instruction from a user, a response to a control command from the information terminal wherein an instruction related to media communication is recorded, or an event of media communication with an opposite party of media communication. The information terminal performs control of media communication function and/or media terminal function of information terminal in accordance with the reporting from the media terminal.

An instruction from a user includes an instruction of operation to devices on media terminal such as a hook button or a dial button of a telephone set, or the like. A control command from information terminal instructs to retrieve a communication log or a recorded message. A response to the control command includes creating and sending the communication log or the recorded message.

An event of media communication with an opposite party of media communication includes notification of connection request or notification of disconnected or the like. A control of media communication function or terminal function on an information terminal includes displaying a content of connection request on the information terminal and outputting voice of recorded message to a speaker on the information terminal.

In accordance with still another aspect of the present invention, a media communication control system includes a media terminal and an information terminal connected by a packet switched network. In this method, the media terminal has a third control means that generates, based on an instruction from a user, a response to a control command from the information terminal wherein is recorded an instruction related to media communication, or an event of media communication with an opposite party of media communication, a control command wherein is recorded the reporting to an information terminal, and sends to the information terminal. The information terminal has a fourth control means that performs, based on a control command received from the media terminal, control of media communication function and/or terminal function of the information terminal.

In accordance with still another aspect of the present invention a computer readable recording medium includes a communication control program stored thereon, the program used in a media terminal on a packet switched network is recorded for executing following steps:

A. A step that generates, based on an instruction from a user, a response to a control command from the information terminal wherein an instruction related to media communication is recorded, or an event of media communication with an opposite party of media communication, a control command wherein the reporting to the information terminal is recorded, and B. A step that sends the control command to the information terminal on the packet switched network.

In accordance with still another aspect of the present invention, a computer readable recording medium whereon a communication control program used in an information terminal on a packet switched network is recorded for executing following steps:

A. A step for receiving an instruction from a user, a response to a control command from the information terminal wherein an instruction related to media communication, or an event of media communication with an opposite party of media communication from a media terminal on the packet switched network, and B. A step for controlling, based on the control command, media communication function and/or terminal function of the information terminal.

These and other objects, features, aspects and advantages of the present invention will become more fully apparent from the following detailed description of the present invention when taken in conjunction with the accompanying drawings where like reference numerals denote corresponding parts throughout.

BRIEF DESCRIPTION OF THE DRAWINGS

FIG. 3 shows an example of a terminal table used by the media communication control system;

FIG. 4 shows an example of a messages table used by the media communication control system;

FIG. 5 shows an example of a forwarding destination table used by the a media communication control system;

FIG. 7A is a table showing an example of a management table stored in a storage part of the control apparatus of the media communication control system;

FIG. 7B is a table showing an example of a user state table stored in the storage part of the control apparatus of the media communication control system;

FIG. 7C is a table showing an example of a communication state table stored in the storage part of the control apparatus of the media communication control system;

FIG. 7D is a table showing an example of authentication information stored in the storage part of the control apparatus of the media communication control system;

FIG. 7E is a table showing an example of an incoming calls rejection table stored in the storage part of the control apparatus of the media communication control system;

FIG. 9A is flowchart showing the flow of operations in a monitoring process; and FIG. 9B is a flowchart showing the flow of operations in a control process;

FIG. 21 shows an example of the contents of a "RETRIEVE RECORDED MESSAGES LIST" command;

FIG. 22 shows an example of the contents of a "RECORDED MESSAGES LIST" command;

FIG. 23 shows an example of the contents of a "RETRIEVE RECORDED MESSAGE" command;

FIG. 24 shows an example of the contents of a "RECORDED MESSAGE" command;

FIG. 27 shows an example of the contents of "SET FORWARDING" and "CANCEL FORWARDING" commands;

FIG. 30 shows an example of the contents of a "RETRIEVE COMMUNICATION LOG" command;

FIG. 31 shows an example of the contents of one entry from a "COMMUNICATION LOG";

FIG. 35 shows an example of the contents of a "SET" command;

FIG. 36 shows an example of the contents of an "INPUT INFORMATION" command;

FIG. 37 shows an example of the "Set Volume Window";

FIG. 38 shows an example of the contents of a "SET SOUND" command;

FIG. 40 shows an example of the contents of a "CREATE OUTGOING MESSAGE" command;

FIG. 42 shows an example of a "Set/Cancel Rejection of Incoming Calls Window";

FIG. 49 is shows an example of the contents of an "INPUT" command.

DETAILED DESCRIPTION OF THE INVENTION

The following description includes various examples for carrying out the present invention. In each example of the present invention described below, a phone terminal, hereinafter referred to as a telephone set, may be a personal computer or similar processing device capable of effecting the processes described below, such as sending and receiving telephone calls. Further, each telephone set is connected to a network, such as the Internet 1, for communications with information terminals. Such information terminals are either workstations and/or personal computers that include hardware and/or software enabling each information terminal to communicate with a predetermined telephone set or telephone sets, as is described below. It should be understood from the following description that communication between an information terminal and a telephone set is not in the form of a telephone call but is a computer communication that occurs without interrupting or interfering with a current telephone call being conducted on the telephone set. Rather, the information terminal communicates with a specific telephone set for the purpose of configuring the telephone set for, for instance, recording messages, forwarding received telephone calls, making a message to be provided when no one is available to receive a received phone call, etc, as is described in greater detail below.

In the following description, the telephone sets may be multi-media telephones able to communicate in any of a variety of formats. For instance, the telephone sets may be configured for audio communications and/or audio/visual communications (also known as video conferencing).

FIRST MODE FOR CARRYING OUT THE PRESENT INVENTION (1) Overall Configuration

Figure 1:
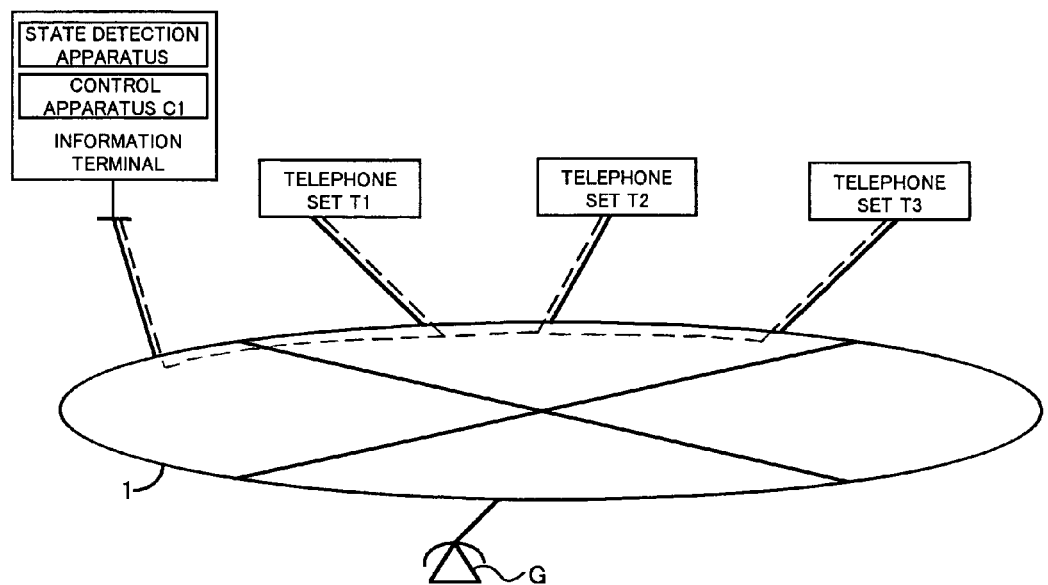
FIG. 1, is a block diagram showing an overall relationship between portions of a media communication control system according to a first embodiment of the present invention.

FIG. 1 shows an overall schematic of the media communication control system according to a first embodiment for carrying out the present invention. A media communication control system according to the present mode includes telephone sets T1, T2, T3 and an information terminal connected by Internet 1. The information terminal has a state detection apparatus and control apparatus C1. Furthermore, the telephone set in the first embodiment, as described below, is primarily a voice phone terminal that may alternatively have also video (i.e., multimedia) capabilities.

In the example depicted in FIG. 1, the telephones sets T1, T2 and T3 are all in different locations. For instance, the telephone set T1 is a telephone set on the desk of a secretary, telephone set T2 is a telephone set in the President's Office in Tokyo, and telephone set T3 is a telephone set in the Vice President's Office in Osaka. The state detection apparatus can be located in any locations as long as it is connected to the Internet 1, and is configured to detect the user state of each of the three telephone sets. It should be understood that the term user state refers to the operational condition of each telephone set and set configurations input by a user, as described in greater detail below.

(2) Configuration of Telephone Set

Figure 2:
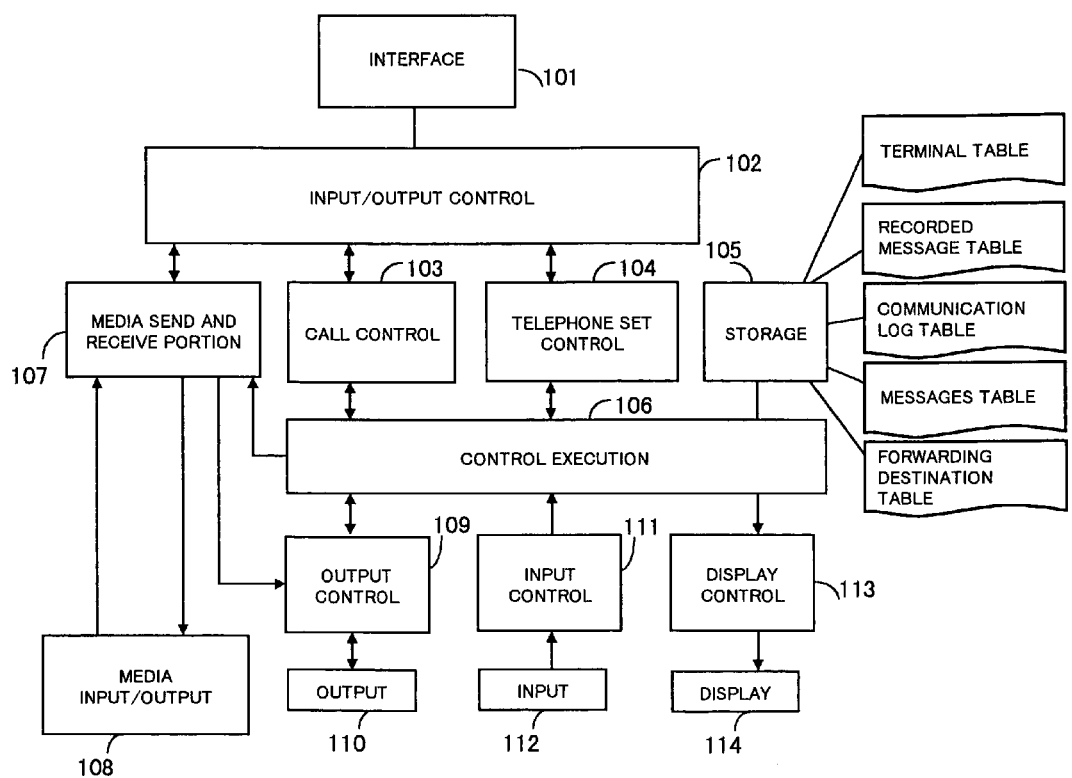
FIG. 2 is a block diagram showing details of a telephone set used in the media communication control system of the present invention.

FIG. 2 shows a block diagram of internal portions of each telephone set. It should be understood that all of the telephone sets T1, T2 and T3 are generally the same and therefore description of one telephone set applies to all telephone sets. Each telephone set, as depicted in FIG. 2, includes an interface (I/F) 101, input/output control 102, call control 103, telephone set control 104, storage 105, control execution 106, media send and receive portion 107, media input/output 108, output control 109, output 110, input control 111, input 112, display control 113 and display 114.

Interface I/F 101

Interface I/F 101 is an apparatus that connects the telephone set to Internet 1 via an integrated cable. The control apparatus and telephone set are connected in a mode such as 10BaseT. The telephone set thereby sends and receives IP packets to and from the control apparatus and to and from other telephone sets. Within this IP packet is recorded commands like a control command, a call control command (communication command), or media stream data. The control command is sent and received between the telephone set and the control apparatus, and includes a command type that specifies the processing to be executed. The details of the control command are described in greater detail below. A call control command is sent and received between telephone sets in order to set up or disconnect telephone calls. In addition, the media stream data is data like voice data and/or video data sent and received to and from another telephone set.

Input/Output Control 102

If a telephone set is connected to Internet 1 as in the present mode for carrying out the present invention, input/output control 102 creates and strips IP (Internet Protocol) headers. Input/output control 102 creates an IP packet wherein is recorded the stream data from media send and receive portion 107, call control 103 and telephone set control 104, and sends the IP packet to I/F 101. The send destination is specified by the send destination IP address and the port number. In addition, the send destination can also be distinguished by writing an identifier at a predetermined position in the stream data, associating the IP address and the port number by the input/output control part, and by the socket number. Furthermore, if an address system other than the IP address is used, an address suited thereto is used.

In addition, input/output control 102 distributes the IP packets received from I/F 101 to media send and receive portion 107, call control 103 and telephone set control 104. Specifically, input/output control 102 distributes to call control 103 IP packets wherein a call control command is recorded. In addition, IP packets wherein a control command is recorded are distributed to telephone set control 104. Furthermore, IP packets wherein media stream data is recorded are distributed to media send and receive portion 107. The distribution is based on the port number that receives the IP packet, the IP address of the sender of the IP packet, the identifier written at the predetermined position in the stream data, and the like.

Media Send and Receive Portion 107

Media send and receive portion 107 converts the media data input by media input/output 108 to a stream data format, and sends it to input/output control 102. For example, media send and receive portion 107 converts the analog voice data input from media input/output 108 to a send and receive format like digital data. Furthermore, media send and receive portion 107 performs processing like compressing the data as needed, and converts the inputted voice data to media stream data. Subsequently, media send and receive portion 107 sends the media stream data to input/output control 102.

In addition, media send and receive portion 107 converts the media stream data received from input/output control 102 to a predetermined data format, and sends it to media input/output 108. For example, media send and receive portion 107 converts the data format of the received voice stream data from the send and receive format like digital data to an analog data format. If the media stream data is compressed, media send and receive portion 107 decompresses the data when converting the data format. Subsequently, the converted data is sent to media input/output 108.

Furthermore, media send and receive portion 107 switches between various types of media output in accordance with the instruction of control execution 106. For example, the output may be switched from media input/output 108 (a handset) to output 110 which may be, for example, a speaker.

Media Input/Output 108

Media input/output 108 is an apparatus for performing input and output of media data such as voice data and video data. Examples of media input/output 108 include a handset, microphone and video camera.

Call Control 103

Call control 103 receives call control command stream data from input/output control 102. Call control 103 analyzes the stream data, and reports the obtained call control command to control execution 106. In addition, if a call control command is received from control execution 106, call control 103 converts the received call control command to a stream data format, and sends it to input/output control 102.

Telephone Set Control 104

Telephone set control 104 receives call control command stream data from input/output control 102. Telephone set control 104 analyzes the received stream data, and reports the control command to control execution 106. In addition, telephone set control 104 receives the control command from control execution 106, converts it to stream data format and sends it to input/output control 102.

Storage 105

Storage 105 holds the terminal table, the communication log table, the recorded messages table, the messages table, the forwarding destination table, various data set in the telephone set, and the like. The time of incoming and outgoing calls, the calling party and the called party, the speaking time, and the like are recorded in the communication log table. The incoming call time, the calling party, the recorded message left by the opposite party, and the like are stored in the recorded messages table.

FIG. 3 is a concept diagram of the terminal table. Registered in the terminal table are the IP address of the information terminal operated by the control apparatus that manages the telephone set, and predetermined information. Predetermined information is information needed to authenticate the control apparatus. The user ID and personal identification number of the information terminal provided with a control apparatus are registered in FIG. 3. The telephone set may be constituted so that it receives only control commands from a specific control apparatus registered in the terminal table.

FIG. 4 shows a concept diagram of the messages table. Predetermined calling party information and an outgoing message to the calling party are correlated and stored in the messages table. In FIG. 4, the calling party IP address and name are stored as the predetermined calling party information.

FIG. 5 shows a concept diagram of the forwarding destination table. Predetermined calling party information and predetermined forwarding destination information are associated and stored in the forwarding destination table. In FIG. 5, the IP address and name are stored as the calling party information and forwarding destination information. The setting of the messages table and forwarding destination table is described in greater detail below. In addition, storage 105 stores the buttons, function keys and display patterns and the like set in the telephone set.

Control Execution 106

Returning to FIG. 2, control execution 106 controls output control 109, display control 113 and media send and receive portion 107, based on commands sent from other telephone sets or the control apparatus. Specifically, control execution 106 receives control commands sent from the control apparatus, and performs processing in accordance with the control commands.

For example, let us consider the case wherein control execution 106 receives the specification of an opposite party and a control command for a connection request. Control execution 106 generates a "SETUP" call control command that requests a connection, and sends that command to call control 103. In addition, let us consider the case wherein control execution 106 receives a control command that requests a communication log. Control execution 106 references the communication log table, and generates a control command wherein the communication log is written. The generated control command is then sent to telephone set control 104.

In addition, if a call control command is sent or received to or from another telephone set, processing is performed in accordance with the received command. For example, let us consider the case wherein control execution 106 receives a "SETUP" command that requests a call. Control execution 106 sends to telephone set control 104 a control command that indicates that a call is requested. This control command is sent from telephone set control 104 to the control apparatus. On the other hand, in order to set up the call, control execution 106 generates a "CONNECT" call control command to be sent to the opposite party, and sends that command to call control 103.

Furthermore, based on the input from input 112, control execution 106 controls output control 109, display control 113 and media send and receive portion 107. For example, if a telephone number is input, the inputted telephone number is displayed on display 114. In addition, the voice data received by media send and receive portion 107 can also be output from output 110, for example. Furthermore, control execution 106 generates a control command based on the input to the telephone set, and sends that command to telephone set control 104. For example, if the handset is lifted and taken off-hook, control execution 106 generates a control command that reports that the hook has been lifted.

Input Control 111

Input control 111 reports the input signal from the input 112 to the control execution 106. Examples of input 112 include various buttons, such as a dial button and speed dial button, and the hook.

Output Control 109

Output control 109 controls the output to output 110. An example of output 110 is a speaker. Output control 109 sends the ring or other such audio signal when there is an incoming telephone call, for example.

Display Control 113

Display control 113 displays on display 114 the data reported from control execution 106. Examples of display 114 include a liquid crystal display and a lamp.

(3) Configuration of Control Apparatus

Figure 6:
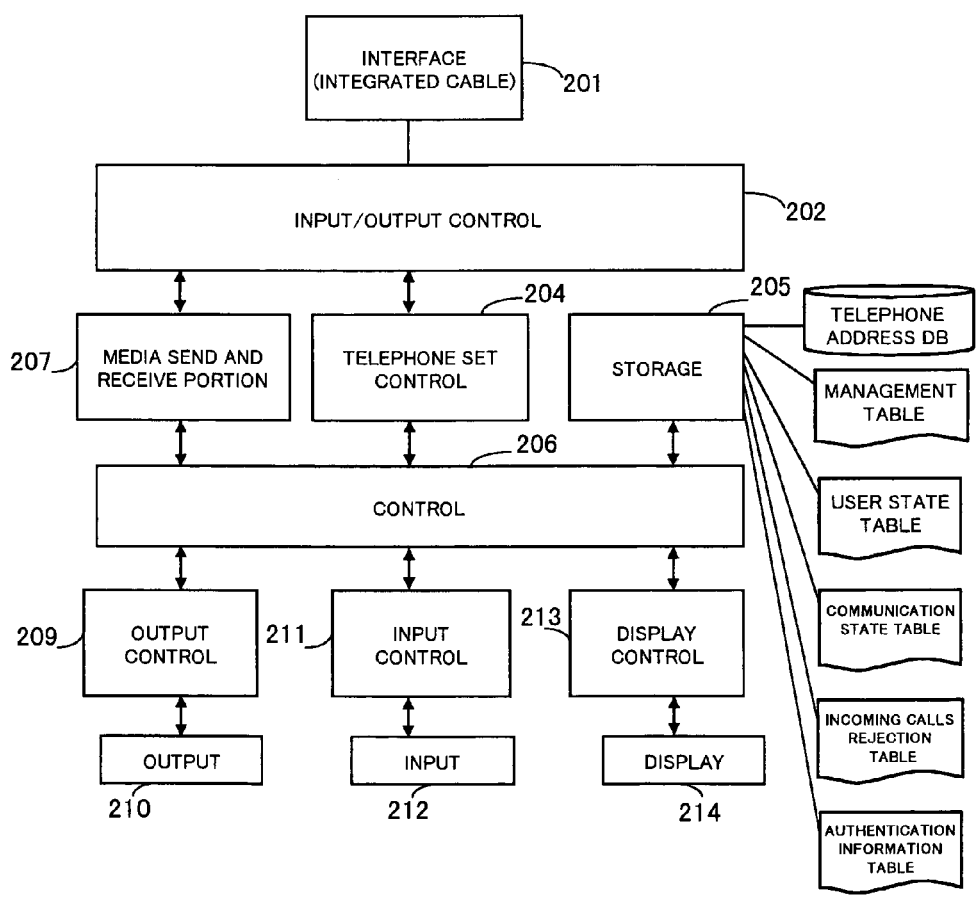
FIG. 6 is a block diagram showing operational relationships of a control apparatus of the media communication control system.

FIG. 6 is a functional block diagram that shows the constitution of control apparatus C1 provided in the information terminal. The control apparatus according to the present invention has interface I/F 201, input/output control 202, telephone set control 204, storage 205, control 206, media send and receive portion 207, output control 209, output 210, input control 211, input 212, display control 213 and display 214. Namely, control apparatus C1 has a construction that is almost the same as a telephone set, except in that the control apparatus C1 has no call control part nor a media input/output portion, and instead has control 206 in place of the control execution. Furthermore, the control apparatus is provided with a call control part and media input/output part, and of course can also perform communication of media data.

Since the functions of each part, excluding control 206, are generally the same as the similarly named portions described above in a telephone set, the explanations thereof are omitted. The control apparatus C1 differs from the above described telephone set in the points described below.

Storage 205

The telephone address DB, management table, user state table, communication state table and incoming calls rejection table are stored in storage 205. In addition, storage 205 holds authentication information used by the various telephone sets to authenticate the control apparatus. The telephone address DB stores the addresses and users of telephone sets on the Internet, and user-related information.

FIG. 7A shows a concept explanatory diagram of the management table. The management table associates and stores the identification numbers T1, T2, T3, names and addresses of telephone sets under the management of control apparatus C1. The name of the telephone set is registered by some method so that it is easily understood by the user. The address of the telephone set should be information that can specify the telephone set. Control apparatus C1 recognizes the telephone set registered in the management table as the send target of the control command.

FIG. 7B shows a concept explanatory diagram of the user state table of storage 205. The identification number of each telephone set and the user state of each telephone set are associated and stored in the user state table. Control 206 acquires the user state from the aforementioned state detection apparatus at, for example, fixed time intervals.

FIG. 7C shows a concept explanatory diagram of the communication state table. The identification number of each telephone set and the communication state of each telephone set are associated and stored in the communication state table. The communication state of each telephone set is reported by a control command sent from each telephone set. The reporting of the communication state is described below. A communication state of "Free" indicates the telephone set in question is not currently engaged in a telephone communication. A communication state of "Connection in progress" indicates a state of connection in progress with respect to an incoming request from another telephone. Other examples of communication states include "Hold," "Communication in progress" and "Disconnect processing in progress."

FIG. 7D shows an example of authentication information maintained by the control apparatus. In the present mode for carrying out the present invention, information that specifies the user who operates the control apparatus is used as the authentication information. A user ID and personal identification number, for example, can be used as the information for specifying the user.

FIG. 7E shows a concept explanatory diagram of an incoming calls rejection table. The calling party for which incoming calls are to be rejected, and the message to the calling party are associated and stored in the incoming calls rejection table. The setting of the incoming calls rejection table is described in greater detail below.

Input Part and Output Part

Examples of input 212 of the control apparatus include a keyboard, mouse and microphone. In addition, an example of output 210 is a speaker. Of course, it is also possible to provide control apparatus C1 with a media input/output means like a handset.

Control 206

Control 206 performs processing in accordance with the control command from the telephone set. In addition, control 206 generates a control command in accordance with the input from the user, and sends that command to telephone set control 204. Consider the case wherein the telephone set sends to the control apparatus a control command that reports the communication state. Control 206 instructs display 214 to display the reported communication state. In addition, let us consider the case wherein the user specifies some telephone set and opposite party, and inputs a connection request. Control 206 sends a control command to the specified telephone set. The opposite party address and the connection request are recorded in this control command.

Operational Flow (1) Flow of Processing Performed by the Telephone Set

Figure 8:
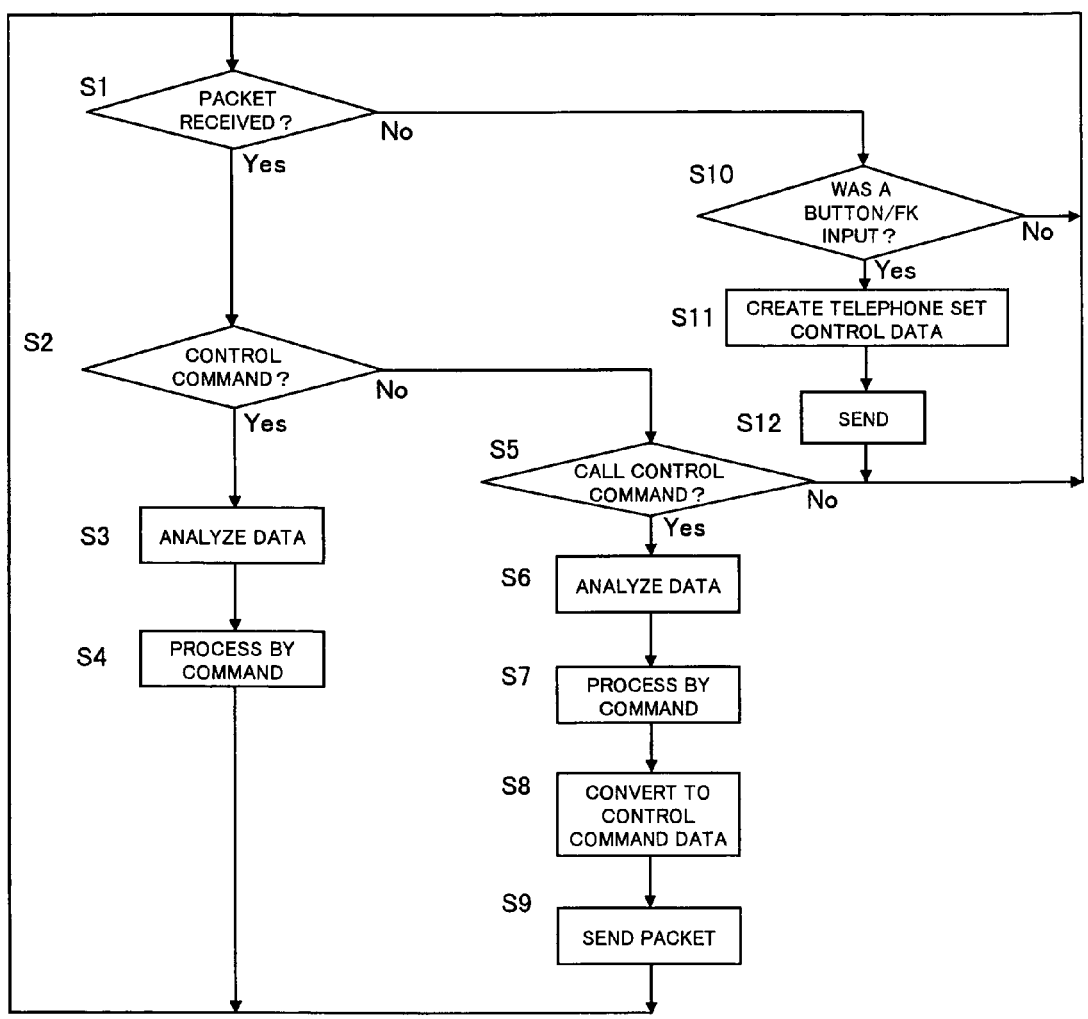
FIG. 8 is a flowchart showing flow of operations performed by the telephone set depicted in FIG. 2.

FIG. 8 is a flowchart that shows the flow of processing performed by the telephone set. Furthermore, FIG. 8 omits an explanation of the normal call control processing performed by the telephone set, and only describes the processing between the telephone set and control apparatus.

The telephone set is in a state in which the power supply is continuously on, and it continuously stands by for reception of an IP packet or an input from the user (Step S1). If an IP packet is received, processing transitions to Step S2. If there has been an input from the user, processing transitions to Step S10, as is described in greater detail below.

In step S2 a determination is made as to whether or not input/output control 102 has received control command stream data. If "Yes", input/output control 102 sends to telephone set control 104 the control command stream data. Subsequently, processing transitions to Step S3. Otherwise, processing transitions to Step S5, as is described in greater detail below.

In Step S3, telephone set control 104 analyzes the control command stream data, and sends the control command to control execution 106.

In Step S4, control execution 106 performs processing in accordance with the control command. For example, let us consider the case wherein the result of the analysis is that there is a "CONNECTION REQUEST" command. Control execution 106 generates a "SETUP" call control command, and sends it to call control 103. In addition, let us assume that a control command that requests the communication log has been received. Control execution 106 reads predetermined information from the communication log table. Then, a control command that includes the read information is generated and sent to the control apparatus. The details of the processing performed by control execution 106 are described in greater detail below.

If the determination is "No" in Step S2, processing transitions to Step S5. In Step S5, the input/output control part judges whether call control command stream data is recorded in the IP packet. If "Yes," processing transitions to Step S6. If "No," processing returns to Step S1 and stands by for an IP packet or a user input. It should be understood that if media stream data is received, the processing is similar, but not illustrated since processing the same as described above.

In Step S6, call control 103 analyzes the call control command stream data received from another telephone set, and sends the call control command to control execution 106.

In Step S7, control execution 106 generates a control command in accordance with the call control command. For example, if the call control command is one that represents an incoming call, the control command that reports that the "Connection in progress" is generated. The generated control command is sent to telephone set control 104.

In Step S8, telephone set control 104 converts the control command to the control command stream data. The converted data is then sent to input/output control 102.

In Step S9, input/output control 102 adds an IP header to the control command stream data, and sends the IP packet.

If an event other than the reception of an IP packet occurs in Step S1, processing transitions to Step S10. Step S10 judges whether a button or function key (FK) and the like has been pressed, and whether the telephone receiver has been lifted off the hook. If "Yes," processing transitions to Step S11. If "No", processing returns to Step S1.

In Step S1, control execution 106 generates a control command that reports the input, and sends that command to telephone set control 104.

In Step S12, telephone set control 104 converts the control command to stream data. The converted data is sent as an IP packet by input/output control 102.

(2) Flow of Processing Performed by the Control Apparatus

Figure 9A:
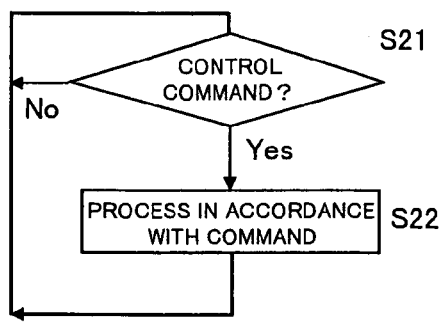
FIGS. 9A and 9B are flowcharts showing the flow of processing performed by the control apparatus, specifically.
Figure 9B:
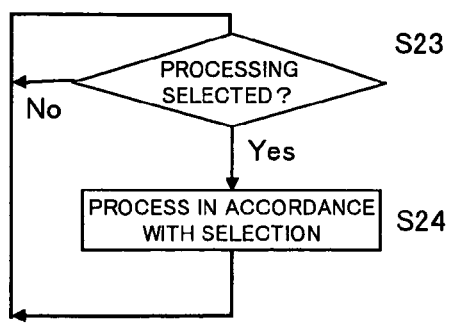

FIGS. 9A and 9B are flowcharts that shows the flow of processing performed by the control apparatus. FIG. 9A is a flowchart showing the flow of operations in monitoring processing. FIG. 9B is a flowchart showing the flow of operations in control processing in accordance with a user input to the telephone set. The control apparatus independently executes the state monitoring processing and control processing. The control apparatus may be activated together with the activation of the information terminal, or may be activated by an instruction from the user. In the present example, the explanation is based on activation together with the activation of the information terminal.

(a) Monitoring Processing

In monitoring processing, control apparatus C1 stands by for a control command from telephone sets T1 to T3 under its control (Step S21). If some IP packet is received, input/output control 202 judges whether it is a control command from the telephone set. If "Yes," the control command stream data is sent to telephone set control 204, and processing transitions to Step S22. If "No," processing returns once again to Step S21, and stands by for reception of the next IP packet.

Figures 10, 11:
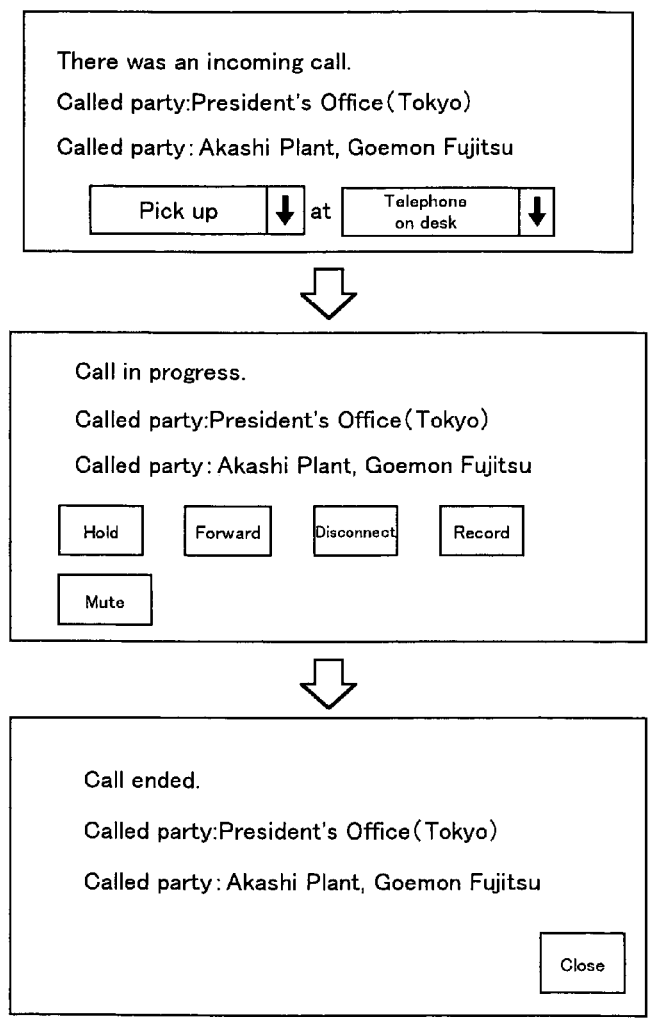
FIG. 10 is a view showing one example of the "State Notification Window" displayed by the control apparatus in accordance with the reporting of the communication state, the upper portion of FIG. 10 showing a window that reports the state wherein the telephone set has received an incoming call, the middle portion of FIG. 10 showing a window that reports the fact that the telephone set is in a call in progress state, and the bottom portion of FIG. 10 showing a window that reports the state wherein the telephone set has become disconnected from the call.
FIG. 11 shows an example of the contents of a "REPORT" command.

In Step S22, telephone set control 204 analyzes the control command stream data. Control 206 then performs processing in accordance with the analyzed control command. For example, if the control command is one that reports the communication state of the telephone set, the reported communication state is displayed. FIG. 10 shows an example of a screen that reports the state of the telephone set. The upper portion of FIG. 10 shows a window that reports that there was an incoming call from "Goemon Fujitsu" to telephone set T2 in the President's Office. Subsequently, processing returns to Step S21, and stands by for the next control command from the telephone set.

(b) Telephone Set Control Processing

In Step S23, the control apparatus stands by for the selection of operation by the user, or the selection of a telephone set. Operations include "Connect," "Output the communication log," "SET FORWARDING DESTINATION" and the like. If some operation and a telephone set are selected, processing transitions to Step S24.

In Step S24, the control apparatus performs processing in accordance with the selection. For example, if telephone set T1 and "CONNECT" are selected, the telephone set of the connection destination is specified. The control apparatus then sends to the selected telephone set T1 a control command wherein is recorded the address of the connection destination and the connection request. Subsequently, processing returns to Step S23, and stands by for selection of the next processing.

Specific Processing and Control Commands

The following explains specific examples of the processing performed by control 206 of the control apparatus and control execution 106 of the telephone set. In addition, an example is explained for control commands generated by the control 206 and by a control execution 106 in a telephone set.

(1) State Notification Processing (1.1) Display Screen

FIG. 10 shows one example of a "State Notification Window" displayed by the control apparatus in accordance with the reporting of the communication state from the telephone set. The upper portion of FIG. 10 shows a window that reports the state wherein an incoming call was received by the telephone in the President's Office. If it is desired to pick up the call at another telephone set, the "Telephone on the desk" is pressed. Thereupon, a pull-down menu is displayed and the selection of some telephone set outside the President's Office is received. If some telephone set is selected and the "PICK UP" button is pressed, a control command that gives an instruction to pick up is sent. The control command is explained later.

The mid-portion of FIG. 10 shows a window that reports the state wherein the telephone set has a call in progress. If a button displayed in this window is pressed, a control command corresponding to the pressed button is sent to the telephone set with a call in progress. For example, if the "HOLD" button is pressed, a control command that instructs that the call should be placed on hold is sent. The control command is discussed later.

The lower portion of FIG. 10 shows a window that reports the state wherein the telephone set disconnects the call. Information that specifies the called party and calling party telephone sets and the communication state of the telephone sets are displayed in the "State Notification Window." The message in the window changes in accordance with the state. In addition, it is preferable to display information related to the calling party.

(1.2) Control Command

FIG. 11 shows an example of the content of the "REPORT" command that reports the communication state. The "REPORT" command includes the command type, requesting party, call identifier, called party address, calling party address, communication state type, result and detail. The command type indicates the processing to be executed on the side that receives the control command. In the present mode for carrying out the present invention, "0x33" is used as the command type that instructs the reporting of the communication state. The requesting party address is the address of the telephone set that sends the command. The call identifier is used to indicate to what call the command is responding. The call identifier is the same in the control command below.

The address of the telephone in which the communication state has changed is recorded as the called party address. The calling party address indicates the address of the telephone set of the opposite party that changed their communication state. Furthermore, in the present mode for carrying out the present invention, it is assumed that the IP address will be used as the information to specify the connection destination, calling party, called party, requesting party, and the like.

The communication state type is predetermined identification information that indicates the communication state. For example, "0x01" indicates "Incoming call," "0x02" indicates "Communication in progress," "0x03" indicates "Disconnection in progress" and "0x04" indicates "Paging in progress."

A "0" result, for example, indicates that reporting of the communication state was normal. A "1" result indicates that the communication state cannot be acquired. A "0" detail, for example, indicates that communication is normal. A "1" detail indicates that there is a no communication state, and "2" indicates that another error occurred.

(1.3) Flow of Processing

Figure 12:
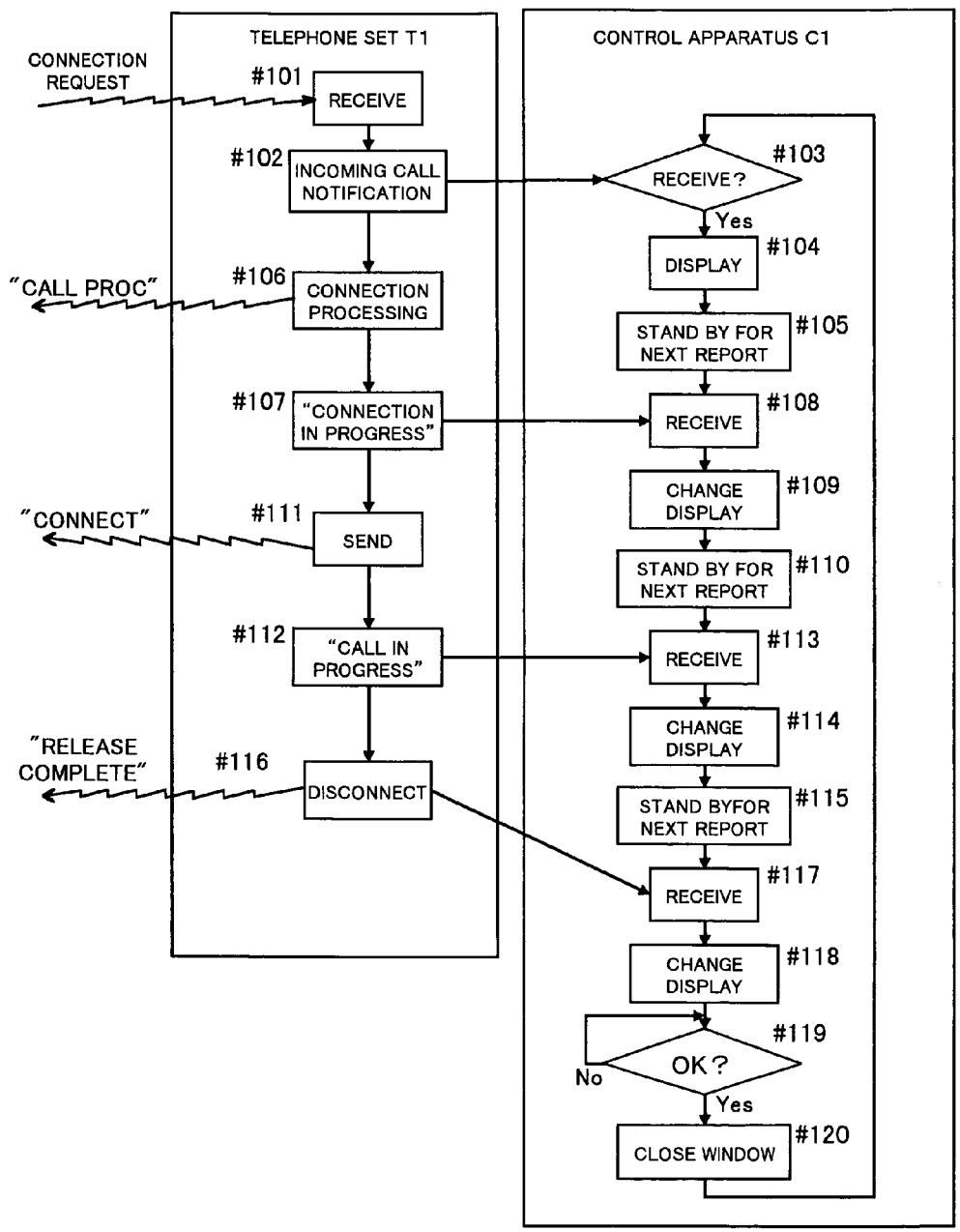
FIG. 12 is a flowchart showing the operations of a state notification process.

FIG. 12 is a flowchart that shows the flow of operations of state notification processing. Telephone set T1 reports the communication state to control apparatus C1. Control apparatus C1 displays on the display the reported communication state. Furthermore, to simplify the explanation, only telephone set T1 is shown in the figure; the processing of the other telephone sets T2, T3 is the same.

First, if there is an incoming call to the telephone set (#101), the telephone set sends to the control apparatus a "REPORT" command that reports an incoming call (#102). The control apparatus that receives the "REPORT" command displays the "State Notification Window" as shown in the upper portion of FIG. 10 (#103, 104). Then, the control apparatus stands by for the next state notification (#105).

The telephone set that receives the incoming call sends a "Call proc" call control command to the opposite party, and transitions to processing to connect with the opposite party (#106). Furthermore, the telephone set sends to the control apparatus a "REPORT" command that reports that the connection is in progress (#107). The control apparatus changes the message in the "State Notification Window" to, for example, "Connection in progress" (#109). Next, the control apparatus stands by for the next control command (#110).

Next, if the handset is picked up, the telephone set sends a "CONNECT" call control command (#111), and sends to the control apparatus a "REPORT" command that reports that a call is in progress (#112). The control apparatus receives this report and changes the message in the "State Notification Window" to "Communication in progress" and the like (#113, 114). Furthermore, the control apparatus stands by for the next report (#115).

If the handset is placed on-hook by the user terminating the call, the telephone set sends or receives a "Release complete" call control command, and reports to the control apparatus the fact that the call was terminated (#116). The control apparatus receives that report and changes the display of the "State Notification Window" (#117, 118).

(2) State Notification Processing in Accordance with the User State (2.1) Display Screen and Flow of Processing State notification processing can also be performed in accordance with the user state. Consider the example in which the control apparatus acquires from the state detection apparatus the user state at fixed time intervals, and writes it to the user state table. If a "REPORT" command is received from the telephone set, the control apparatus determines whether the user is absent; if the user is judged to be absent, a state notification window that reports that there was a telephone call is displayed.

Figure 13:
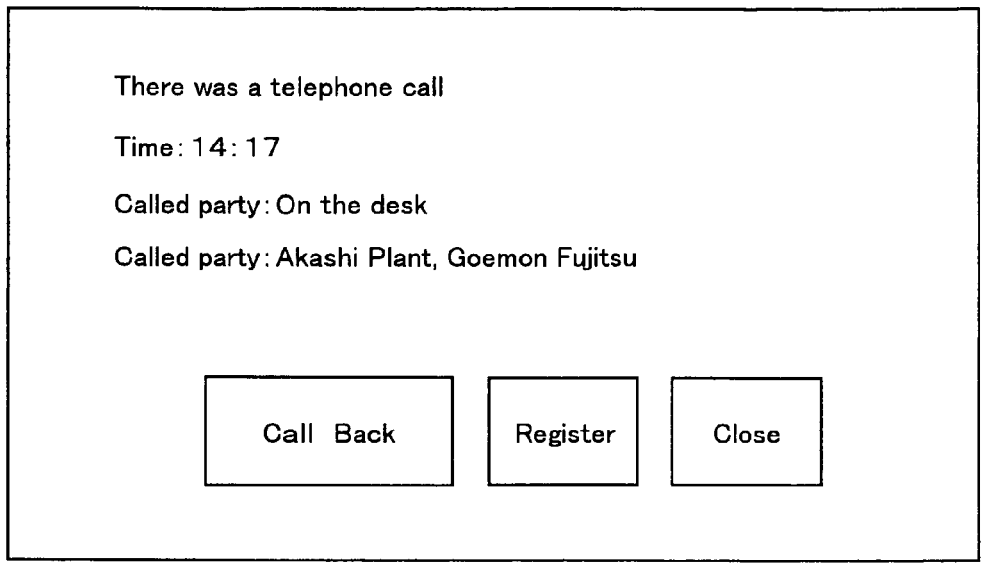
FIG. 13 shows an explanatory diagram showing another example of the state notification window.

FIG. 13 shows another example of the "State Notification Window." A "There was a telephone call" message, the incoming call time, the calling party and the called party are indicated in the "State Notification Window." If the user presses the "Call back" button, the calling party address and a "CONNECTION REQUEST" command, which is discussed later, are sent to the telephone set of the called party. If the "Register" button is pressed, predetermined information like the telephone number and name of the calling party are stored in the telephone address DB. The predetermined information is extracted from the "REPORT" command by control 206. If the "Close" button is pressed, the window closes.

The explanation of the content of the "REPORT" command is the same as described above, and is therefore further description is not repeated.

(3) Connection Request (3.1) Display Screen

Figure 14:
FIG. 14 shows an explanatory diagram of one example of a main menu.

The following explains an example of the processing wherein the connection destination is specified and a connection request is made from the control apparatus to the telephone set. The control apparatus is activated together with the activation of the information terminal, and displays the "Main Menu" on the display part based on a user instruction and the like. FIG. 14 shows an example of the "Main Menu." Processing that can be selected is displayed beforehand in the "Main Menu." If "CONNECTION REQUEST" is selected by the user, the "Connection Window" shown in FIG. 15 is displayed.

Figures 15, 16:
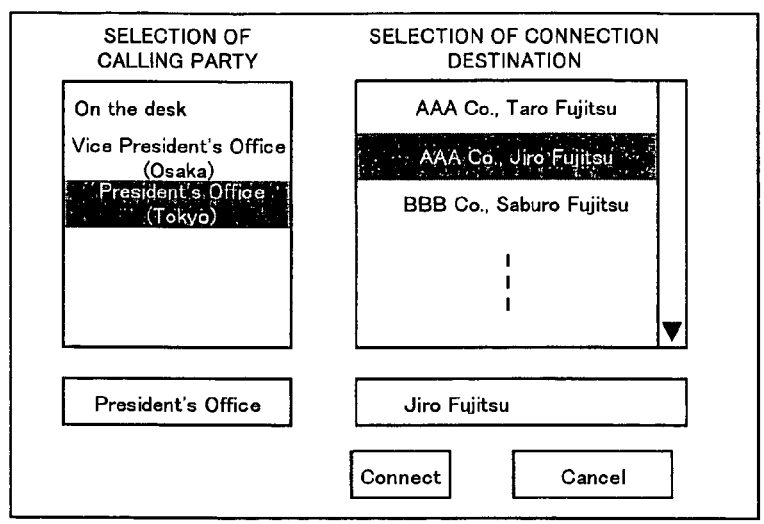
FIG. 15 shows an explanatory diagram of an example of the "Connection Window"
FIG. 16 shows an example of the contents of a "CONNECTION REQUEST" command.

FIG. 15 is an example of the "Connection Window" displayed on display 214 by control 206. Control 206 receives the selection of the calling party and the connection destination, and requests the calling party telephone set to connect both parties. For the convenience of the user, a list of telephone sets under the control of control apparatus C1 may be displayed as selectable calling parties. In addition, to simplify the selection of the connection destination, the contents of the telephone address DB may be displayed as selectable connection destinations. If a calling party and a connection destination are selected and the "CONNECT" button is pressed, a "CONNECTION REQUEST" command is sent from the control apparatus to the calling party telephone set. FIG. 15 shows the case wherein a request is made to telephone set T2 in the President's Office to connect to the telephone set of the "Jiro Fujitsu" user.

(3.2) Control Command

FIG. 16 shows an example of the constitution of the "CONNECTION REQUEST" command sent by the control apparatus. The "CONNECTION REQUEST" command includes the command type, call identifier, connection destination address, requesting party address, result and detail.

In the present mode for carrying out the present invention, "0×05" is used as the command type that indicates a "Connection request." Information that specifies the user selected as the connection destination by the connection window is recorded in the connection destination address. The IP address of the control apparatus is recorded in the requesting party address area shown in FIG. 16.

(3.3) Flow of Connection Request Processing

Figure 17:
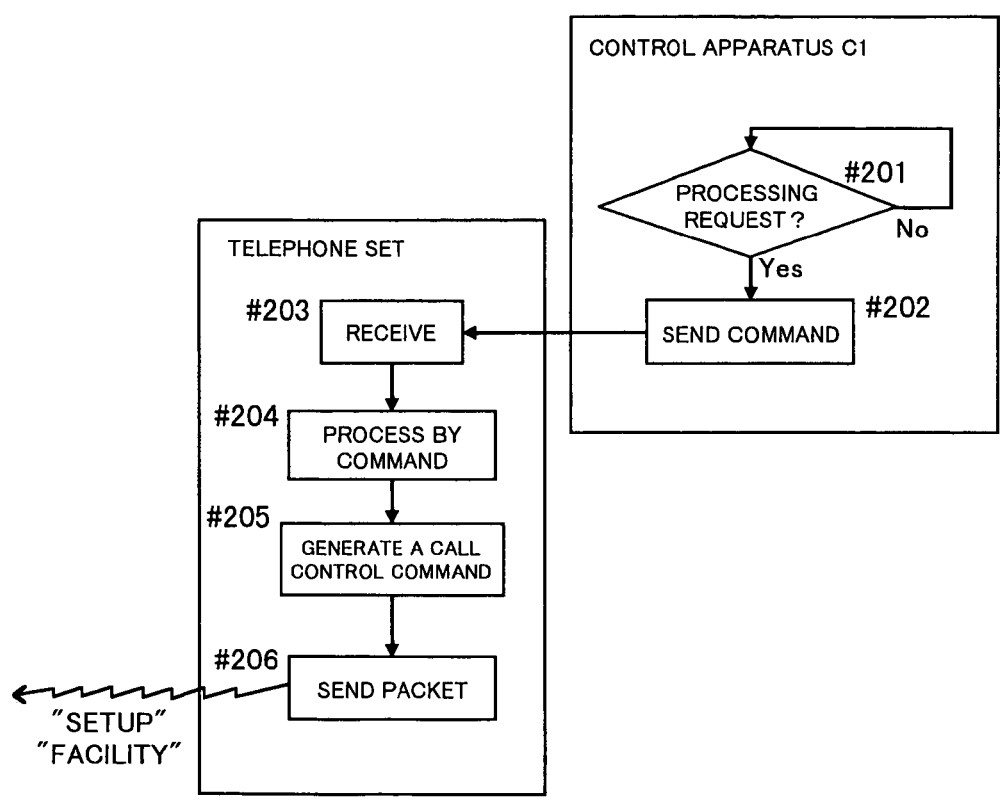
FIG. 17 shows a flowchart of the flow of operations in call control processing performed by the control apparatus.

FIG. 17 shows the flow of processing wherein a connection request is made from the control apparatus to the telephone set.

The control apparatus stands by for the selection of processing by the user (#201). If a connection request is made, a "CONNECTION REQUEST" command is sent to the calling party telephone set (#202). The telephone set analyzes the "CONNECTION REQUEST" command, and generates a call control command (#203, 204, 205). Next, the telephone set sends to the specified connection destination an IP packet wherein is recorded the call control command stream data (#206).

(4) Forward, Hold and Pick Up (4.1) Display Screen

Figure 18:
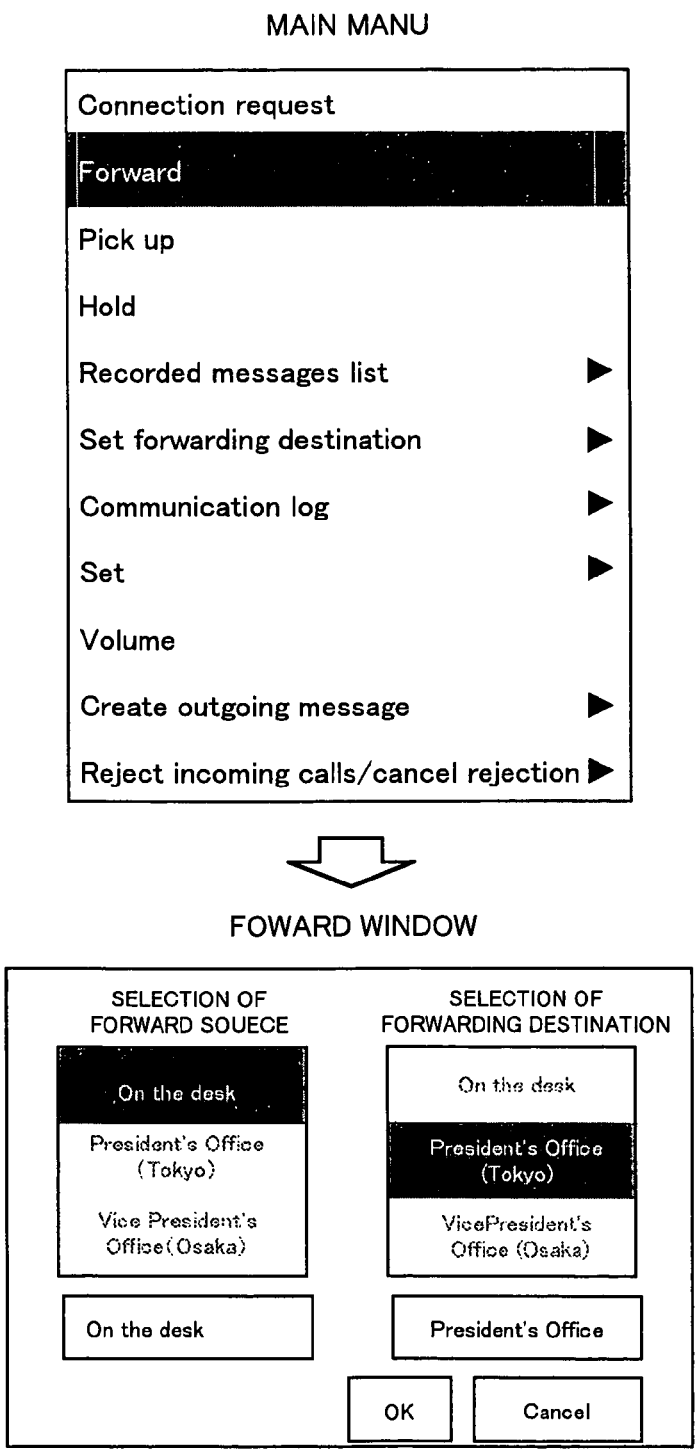
FIG. 18 shows an example of the main menu where "Forward Window" has been selected, and beneath the main menu, the selected "Forward Window" is displayed.

The following explains the case wherein "FORWARD" is selected in the "Main Menu" shown in FIG. 14. If some telephone set under the management of the control apparatus is in a communication in progress state and "FORWARD" is selected, the "Forward Window" shown in FIG. 18 is displayed. The "Forward Window" receives the settings of the forwarding source and forwarding destination. If the user selects a forwarding source and a forwarding destination and then presses the "OK" button (FIG. 18), the control apparatus sends a "Forward request" command to the forwarding source. FIG. 18 shows that, among the three telephones under the management of the control apparatus, the telephone sets T2, T3, which are in a no communication state, are not selectable as a forwarding source. If telephone set T1, which is "On the desk" is selected as the forwarding source, telephone sets T2, T3 are displayed as selectable forwarding destinations. The forwarding destination may also be made selectable from the telephone address DB. Furthermore, let us consider the case wherein the user selects telephone set T2 in the "President's Office" and presses the "OK" button. Thereupon, telephone set T2 in the "President's Office" is specified and a "Forward request" command is sent from the control apparatus to telephone set T1 "On the desk."

If "HOLD" is selected in the "Main Menu," a list of telephone sets (not shown) that are in a communication state is displayed. If some telephone set is selected, a "Hold request" command is sent to the telephone set. In addition, the control apparatus can also send a "Hold request" command by the pressing of "HOLD" in a state wherein some selection is made in the "State Notification Window." In this case, the send destination telephone set is the telephone set of the "Called party" in the "State Notification Window."

The same operations as for "HOLD" can likewise be executed for "Pick up." However, the telephone set that does the "PICK UP" must be set beforehand. In the present example, telephone set T1 on the desk is set as the telephone set that picks up. In addition, the command that is sent from the control apparatus to the telephone set is the "PICK UP" command.

(4.2) Control Commands

The "Forward request," "Hold request" and "PICK UP" commands have the same constitution as the "CONNECTION REQUEST" command discussed earlier. However, the connection destination address is recorded in place of the connection source address in the "Forward request" command. The forwarding destination address is the IP address of the forward destination telephone set selected in the "Forward window." The connection destination address is not recorded in the "Hold request" command. The address of the telephone set that picks up the incoming call is recorded in place of the connection destination address in the "PICK UP" command.

(4.3) Flow of Processing

Since the flow of processing of the control apparatus and the telephone set when making a forward request, hold request or pick up request is the same as the flow of processing for a connection request as shown in FIG. 17, a detailed explanation thereof is omitted.

(5) Output of Recorded Messages List and Recorded Message (5.1) Display Screen

Figure 19:
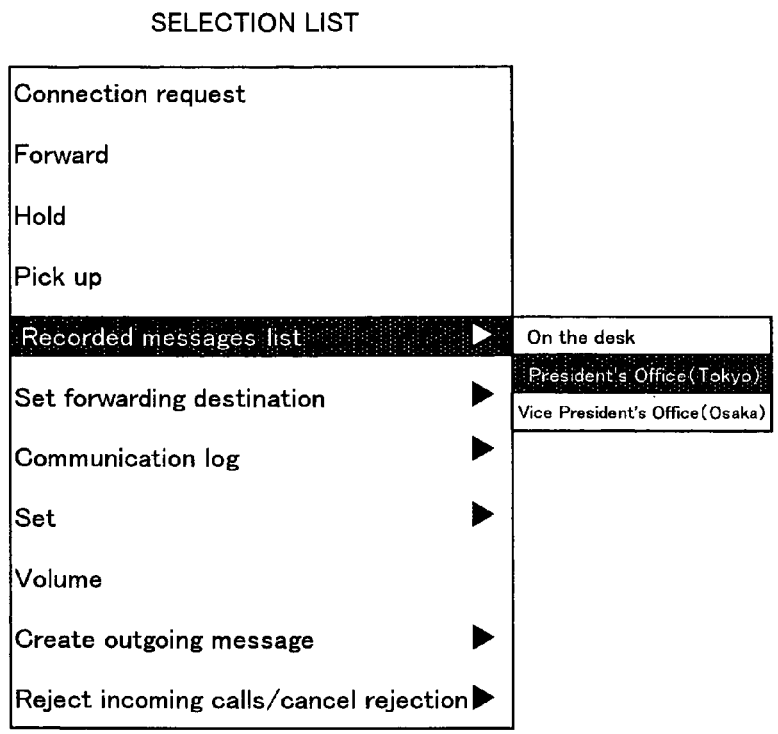
FIG. 19 shows an example of a "Selection List"
Figure 20:
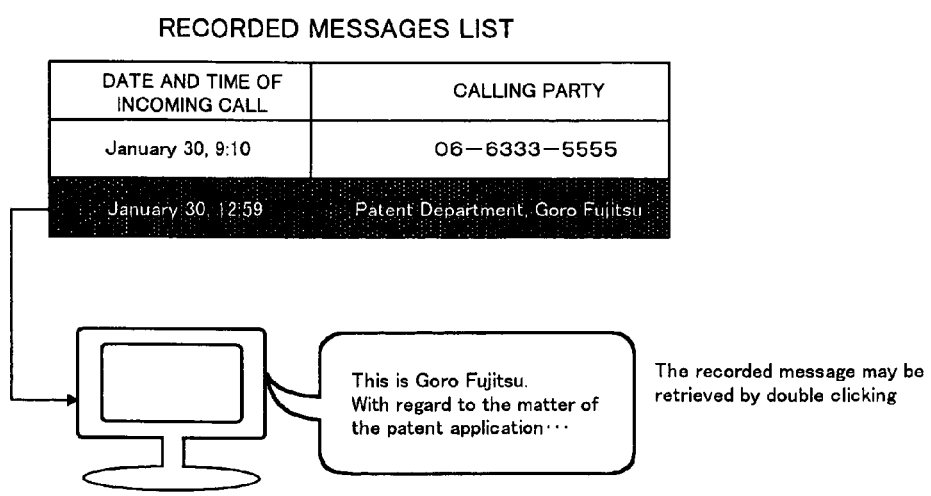
FIG. 20 shows an example of a "Recorded Messages List" command.

If "RECORDED MESSAGES LIST" is selected in the "Main Menu" of FIG. 14, the control apparatus displays on the display part the "Selection List" shown in FIG. 19. The "Selection List" displays a list of telephone sets under the management of the control apparatus. If some telephone set is selected, the "RECORDED MESSAGES LIST" shown in FIG. 20 is displayed. The "RECORDED MESSAGES LIST" of FIG. 20 displays the incoming call date and time and the calling party of the recorded messages stored in the telephone set. If some entry is selected, the selected recorded message is output from a speaker and the like of the control apparatus. In addition, the recorded message can also be output from the telephone set handset and the like.

(5.2) Control Command

"RETRIEVE RECORDED MESSAGES LIST" Command

If the "RETRIEVE RECORDED MESSAGES LIST" and telephone set are selected, the control apparatus sends to the selected telephone set a "RETRIEVE RECORDED MESSAGES LIST" command. FIG. 21 shows an example of the constitution of the "RETRIEVE RECORDED MESSAGES LIST" command. The "RETRIEVE RECORDED MESSAGES LIST" command includes a command type, requesting party address, result and detail. In the present mode for carrying out the present invention, "0×88" is used as the command type that instructs retrieving of the recorded messages list. The IP address of the information terminal is recorded in the requesting party address, in the same manner as discussed earlier.

"RECORDED MESSAGES LIST" Command

On the other hand, the telephone set that receives the "RETRIEVE RECORDED MESSAGES LIST" command reads predetermined information from the recorded messages table. The read information is recorded in the "RECORDED MESSAGES LIST" command, and then sent to the control apparatus. Based on this command, the "RECORDED MESSAGES LIST" shown in FIG. 20 is displayed. FIG. 22 shows an example of the constitution of the "RECORDED MESSAGES LIST" command. The "RECORDED MESSAGES LIST" command includes the command type, requesting party address, number of recorded messages, message number, message start time, recording time, caller address, caller information, result and detail. The message number, recording start time, recording time, caller telephone number and caller information sets number the same as the number of recorded messages.

In the present embodiment for carrying out the present invention, "0×08" is used as the command type of the "RECORDED MESSAGES LIST" command. The requesting party address is the address of the telephone set that sends the command. The number of recorded messages indicates the number of recorded messages. The message number is an identification number that specifies a recorded message. The recording start time indicates the time when recording of the recorded message started. The recording time indicates the message recording time. The calling party address and caller information are recorded when that information is obtained. The name, department name and the like are used as the caller information. A result of "0" indicates that sending of the recorded messages list was normal. A result of "1" indicates that a recorded message could not be acquired. A detail of "0" indicates that sending of the recorded messages list was normal, "1" indicates that there are no recorded messages, and "2" indicates that some other error occurred.

"RETRIEVE RECORDED MESSAGE" Command

If some entry in the "RECORDED MESSAGES LIST" shown in FIG. 20 is selected, a "RETRIEVE RECORDED MESSAGE" command is sent from the control apparatus to the telephone set. FIG. 23 shows an example of the constitution of the "RETRIEVE RECORDED MESSAGES LIST" command. The "RETRIEVE RECORDED MESSAGES LIST" command includes a command type, requesting party address, message number, result and detail. In the present mode for carrying out the present invention, "0×89" is used as the command type that indicates "Retrieve recorded message." In the same manner as discussed earlier, the requesting party address is the IP address of the information terminal wherein the control apparatus is provided. The message number is acquired from the "RECORDED MESSAGES LIST" command. The result and detail are the same as discussed earlier.

"RECORDED MESSAGE" Command

The telephone set that receives the "Retrieve recorded message" command extracts from the storage part the message specified by the message number, and sends an "RECORDED MESSAGE" command. FIG. 24 shows an example of the constitution of an "RECORDED MESSAGE" command. The "RECORDED MESSAGE" command includes a command type, requesting party address, coding type, message length, message (voice data), result and detail. In the present mode for carrying out the present invention, "0×09" is used as the command type of the "RECORDED MESSAGE" command. The requesting party address is the address of the telephone set that sends the command. The coding type indicates the coding technique of the recorded message. Examples of coding techniques include G.711μ-Law, G.711A-Law, G.723 and G.729. The message length indicates the number of bytes of the recorded message. The message is stream data like voice data that has been digitized by the coding method specified by the coding type. A result of "0" indicates that communication between the telephone set and the control apparatus is normal. A result of "1" indicates that the recorded message cannot be acquired. A detail of "0" indicates normal, "1" indicates that there are no messages, and "2" indicates that another error occurred. The control apparatus that receives the "RECORDED MESSAGE" command outputs the message by an output apparatus like a speaker.

"Output Recorded Message" Command

The recorded message can be output to the telephone set in addition to the control apparatus. For example, if some entry in the "RECORDED MESSAGES LIST" is selected, the control apparatus sends an "Output recorded message" command to the telephone set. The constitution of the "Output recorded message" command is the same as that of the "RETRIEVE RECORDED MESSAGE" command, and is therefore omitted from the drawings. However, "0×8b" that indicates "Output recorded message" is used as the command type. The telephone set that receives this command retrieves from the recorded messages table the recorded message specified by the message number. The retrieved message is output via an output means like a handset.

(5.3) Flow of Processing

Figure 25:
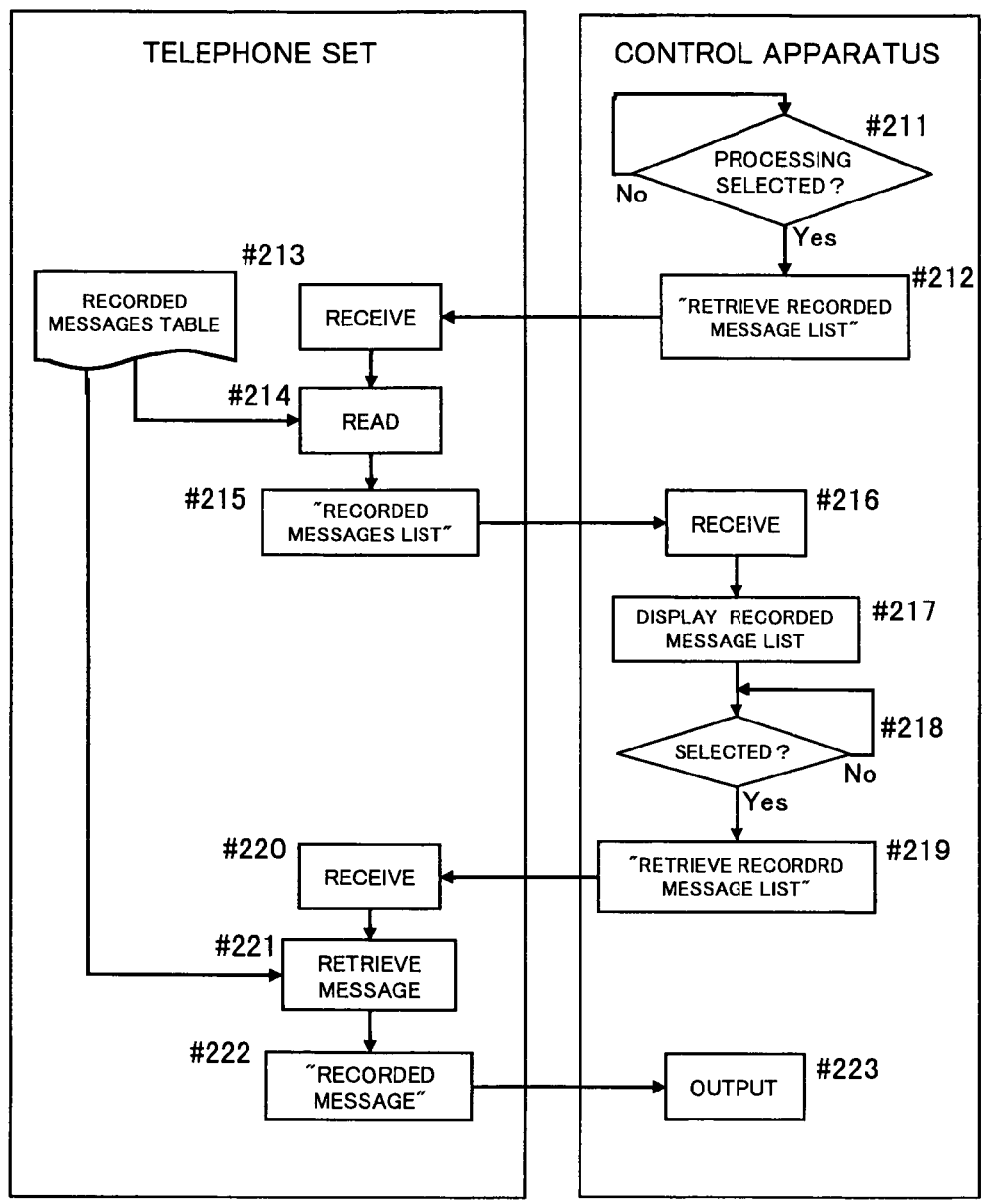
FIG. 25 is a flowchart showing the flow of operations for displaying the recorded messages list and for retrieving a recorded message.

FIG. 25 shows the flow of processing for displaying the recorded messages list and retrieving a recorded message. The following explains the case wherein a recorded message is output from the output part of a control apparatus.

First, the control apparatus stands by for selection of processing by the user and, if an entry in the recorded messages list is selected, sends a "Retrieve recorded messages list" command to the telephone set (#211, 212).

The telephone set that receives this command references the recorded messages table, and reads predetermined information (#213, 214). The telephone set generates an "RECORDED MESSAGES LIST" command based on the information that was read, and sends that command to the control apparatus (#215).

The control apparatus that receives this command displays the "RECORDED MESSAGES LIST" and stands by for the selection of some entry (#216, 217, 218). Next, the control apparatus acquires from the "RECORDED MESSAGES LIST" command the message number of the selected entry, and sends a "RETRIEVE RECORDED MESSAGE" command to the telephone set (#219).

The telephone set that receives this command retrieves from the recorded messages table the specified message, and generates an "RECORDED MESSAGE" command (#221). The generated command is sent to the control apparatus (#222). The control apparatus that receives this command audio outputs the recorded message from a speaker and the like (#223).

(6) Setting of Forwarding Destination (6.1) Display Screen

Figure 26:
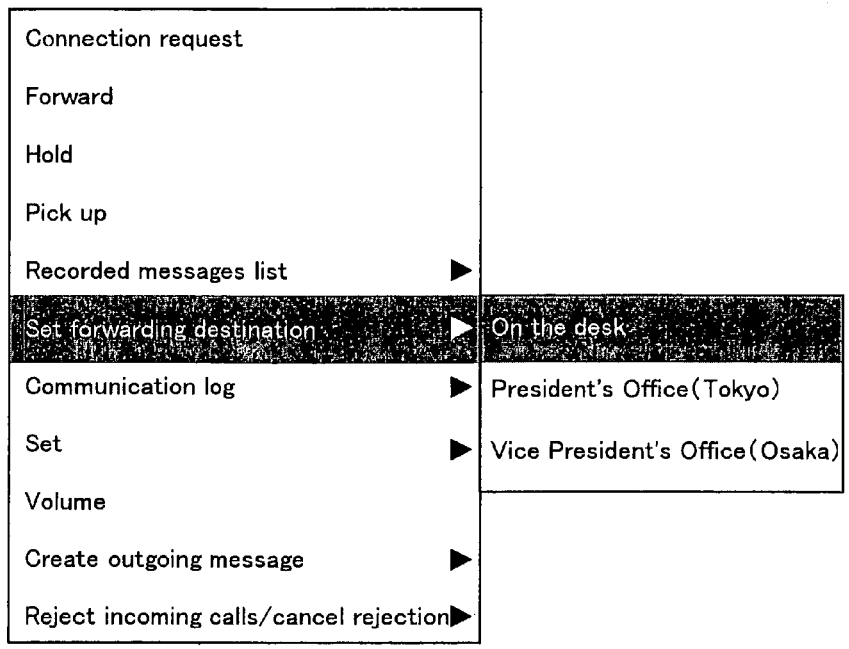
FIG. 26 shows an example of a "Set Forwarding Destination Window" for selection of a forwarding destination in a forwarding destination table.

The following explains the processing wherein the forwarding destination of an incoming call to a telephone set under the management of a control apparatus is set by the control apparatus. If "SET FORWARDING DESTINATION" in the "Main Menu" of FIG. 14 is selected, the "Selection List" is displayed in the same manner as discussed earlier. If a telephone set is selected as the set target, the "Set Forwarding Destination Window" shown in FIG. 26 is displayed. In FIG. 26, telephone set T1 "On the desk" is selected as the set target.

The "Set Forwarding Destination Window" in FIG. 26 receives the setting or canceling of the calling party, time and forwarding destination. In FIG. 26, an incoming call from the calling party "Goemon Fujitsu" to telephone set T1 is forwarded to telephone set T2 in the "President's Office" in Tokyo if the time is between 17:00 and 08:00. In addition, if there is an incoming call from calling party "Saburo Fujitsu" to telephone set T1, it is forwarded to telephone set T3 in the "Vice President's Office" in Osaka, regardless of the time slot. For the convenience of the user, it is preferable to make the calling party and forwarding destination selectable from the telephone address DB. It is possible for the user to select "ALL" corresponding to designate all of the entries in the list. If the "ADD" button is pressed in a state wherein the calling party and forwarding destination are selected (or set), the selected contents are added into the "Set List".

In addition, if an entry of the "Set List" in the "Set Forwarding Destination Window" is selected and the "Delete" button is pressed, the selected entry or entries are deleted from the "Set List".

If the "OK" button is pressed, the control apparatus send the added contents in a "SET FORWARDING" command and the deleted contents are sent in a "CANCEL FORWARDING" command, respectively, to the set target, telephone set T1. Thereafter, the "Set Forwarding Destination Window" closes. If the "Cancel" button is pressed, a command corresponding to additions or deletions is not transmitted.

(6.2) Control Command

FIG. 27 shows an example of the constitution of the "SET FORWARDING" and "CANCEL FORWARDING" commands. Both commands includes a command type, set function type, set flag, requesting party address, forwarding destination address, forwarding destination information, result and detail. "0×8e" is used as the command type of both commands. A set function type of "1" indicates "Set forwarding." A set flag of "0" indicates "SET FORWARDING" and "1" indicates "Cancel setting." The requesting party address is the IP address of the control apparatus, the same as discussed earlier. The forwarding destination address is the IP address of the forwarding destination selected in the "Set Forwarding Destination Window."- Information like the location of the forwarding destination and the name of the forwarding destination user is recorded as the forwarding destination information. If the forwarding destination is selected from the telephone address DB, the forwarding destination information may be acquired from the telephone address DB.

(6.3) Flow of Processing to Set the Forwarding Destination

If the telephone set receives a "SET FORWARDING" command, data that includes the command is written (not shown) to the forwarding destination table (FIG. 5). The forwarding processing for the case wherein the telephone set receives an incoming call is the same as normal forwarding processing. However, if there is an incoming call, the control execution part of the telephone set references the forwarding destination table and reads or references the forwarding destination corresponding to the calling party. If a forwarding destination is not set for the calling party, it is conceivable to perform processing like sending an outgoing message that has been prepared beforehand.

(6.4) Setting of Forwarding Destination (Case Wherein the Control Apparatus has a Forwarding Destination Table)

Sections (6.1) to (6.3) explained a constitution wherein the telephone set is provided with a forwarding destination table. However, a constitution is also possible wherein the control apparatus is provided with the forwarding destination table shown in FIG. 5. In this case, if the "OK" button in the "Set Forwarding Destination Window" is pressed, the control apparatus writes information that was set in the forwarding destination table.

Figure 28:
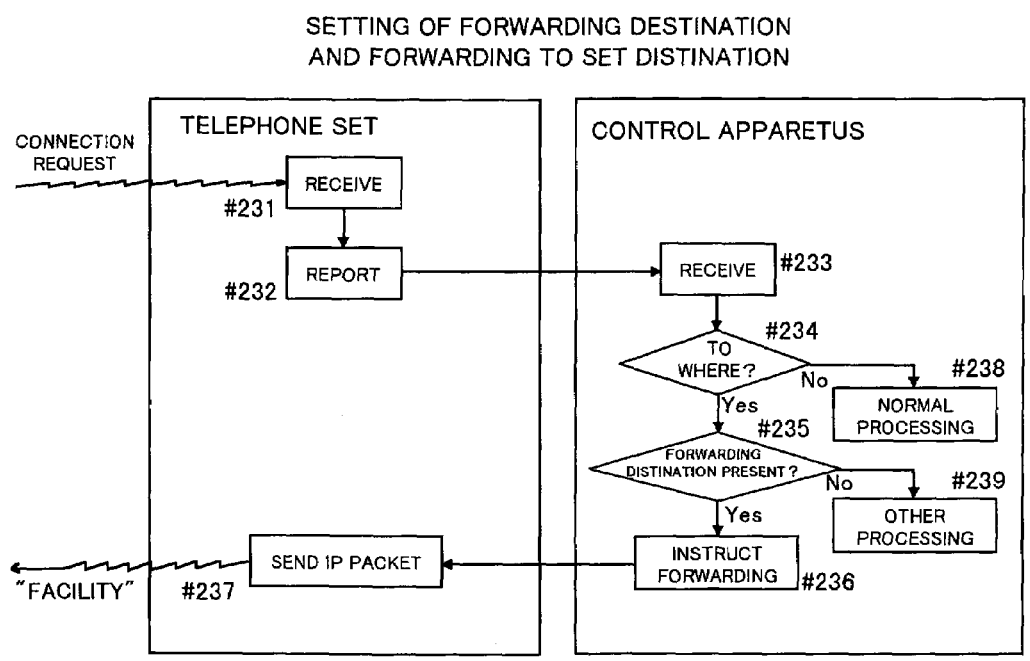
FIG. 28 is a flowchart showing the operational flow of forwarding a telephone call for the case wherein the control apparatus is provided with the forwarding destination table depicted in FIG. 26.

FIG. 28 shows the flow of forwarding processing for the case wherein the control apparatus is provided with a forwarding destination table. The telephone set that receives a connection request sends a "REPORT" command to the control apparatus (#231, 232), as discussed earlier. The control part of the control apparatus acquires the user state from the state detection apparatus, and judges the whereabouts of the user (#233, 234). The state notification window is displayed, unless the user is absent, and normal processing is performed (#238). If the user is absent, the control part judges, based on the whereabouts of the user, whether there is a forwarding destination (#235). For example, if the user is in the conference room, it judges that there is a forwarding destination. If the user has returned home or is out of the office on business, it judges that there is no forwarding destination. If there is a forwarding destination, the control apparatus reports the forwarding destination to the telephone set, and instructs it to forward (#236). This instruction is accomplished by sending a "Forward instruction" command. The telephone set that receives this control command sends a call control command that reports the forwarding destination to the calling party (#237). If it is judged that there is no forwarding destination, other processing is performed (#239). For example, an instruction can be given to send an outgoing message, which is discussed later, to the telephone set.

(7) Display of Communication Log (7.1) Display Screen

Figure 29:
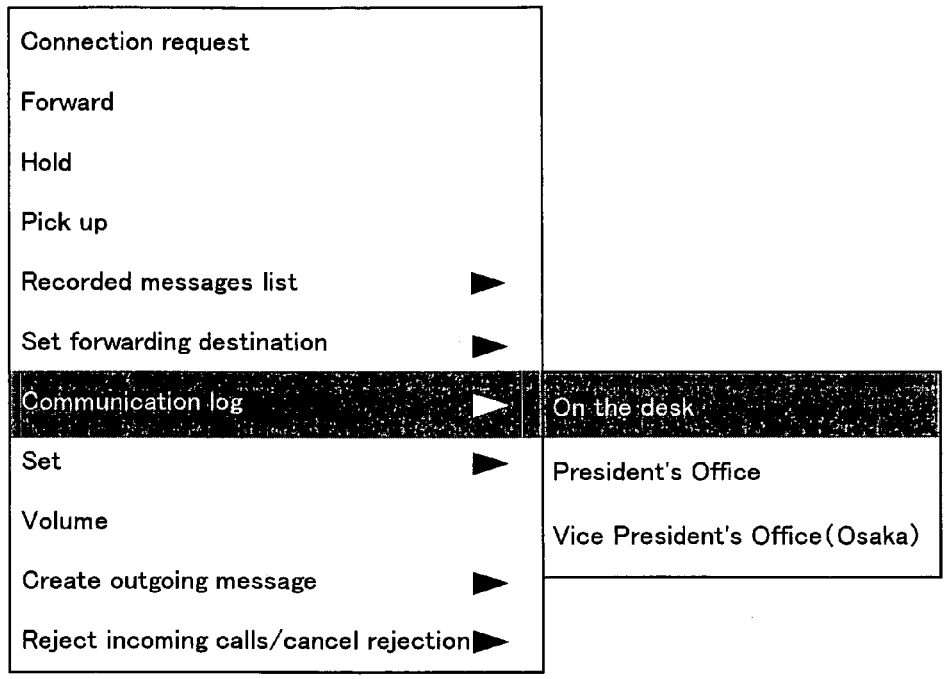
FIG. 29 shows an example of a "Communication Log List"

The following explains the processing wherein the communication log of a telephone set under the management of the control apparatus is output on the display part of the control apparatus. If "COMMUNICATION LOG" in the "Main Menu" of FIG. 14 is selected, the "Selection List" is displayed, the same as discussed earlier. Furthermore, if some telephone set is selected, the "Communication Log List" shown in FIG. 29 is displayed. The communication log information sent from the telephone set is displayed in the "Communication Log List." Examples of communication log information include the time of incoming and outgoing calls, speaking time, connection destination address, opposite party information, result and the like.

The "Communication Log List" may be provided with function buttons as needed. For example, in FIG. 29, if an entry is selected and the "CONNECT" button is pressed, the connection destination address of the selected entry as well as the "CONNECTION REQUEST" command is sent to the telephone set.

(7.2) Control Command

"RETRIEVE COMMUNICATION LOG" Command

If "COMMUNICATION LOG" and a telephone set are selected in the "Main Menu," the control apparatus sends to the telephone set a "RETRIEVE COMMUNICATION LOG" command. FIG. 30 shows an example of the constitution of the "RETRIEVE COMMUNICATION LOG" command. The "RETRIEVE COMMUNICATION LOG" command includes a command type, requesting party address, outgoing/incoming flag, result and detail. In the present mode for carrying out the present invention, "0×8c" is used as the command type that indicates "Retrieve communication log." The requesting party address is the IP address of the control apparatus, the same as discussed earlier. An outgoing/incoming flag of "0" indicates a request for the log of outgoing calls only, "1" indicates a request for the log of incoming calls only, and "2" indicates a request for the log of both outgoing and incoming calls.

"COMMUNICATION LOG" Command

In response to the "RETRIEVE COMMUNICATION LOG" command from the control apparatus, the telephone set sends to the control apparatus a "COMMUNICATION LOG" command. FIG. 31 shows an example of the constitution of the "COMMUNICATION LOG" command. The "COMMUNICATION LOG" command includes a command type, requesting party address, outgoing/incoming calls in list, communication number, outgoing/incoming flag, success flag, outgoing/incoming time, speaking time, connection destination address, opposite party information, result and detail. In addition, the communication number, outgoing/incoming flag, success flag, outgoing/incoming time, speaking time, connection destination address and opposite party information sets that are recorded number the same as the number of outgoing/incoming calls. Furthermore, the information included in the "COMMUNICATION LOG" command is not particularly limited to the communication log information stored in the communication log table of the telephone set. For example, if the communication log table holds call charge data, that call charge data may be included in the "COMMUNICATION LOG" command.

In the present mode for carrying out the present invention, "0×0c" is used as the command type that indicates the "COMMUNICATION LOG" command. The requesting party address is the address of the telephone set issuing the command. The outgoing/incoming calls in list indicates the total number of outgoing and incoming calls. An outgoing/incoming flag of "0" indicates an outgoing call, and "1" indicates an incoming call. A success flag of "0" indicates a successful outgoing/incoming call, and "1" indicates a failure. The outgoing/incoming call time indicates the time when the outgoing/incoming call started. The speaking time indicates the total speaking time. The connection destination address records the IP address of the opposite party telephone set. The opposite party information is recorded if such information is obtained. Examples of such information include the opposite party name, company name, company department name and the like. A result of "0" indicates that reading of the communication log was normal, and "1" indicates that the communication log could not be acquired. A detail of "0" indicates that the reading of the communication log was normal. A detail of "1" indicates that there was no communication log, and "2" indicates that another error occurred. The control apparatus that receives this "COMMUNICATION LOG" command displays on the display the "Communication Log List" shown in FIG. 29.

(7.3) Flow of Processing

Figure 32:
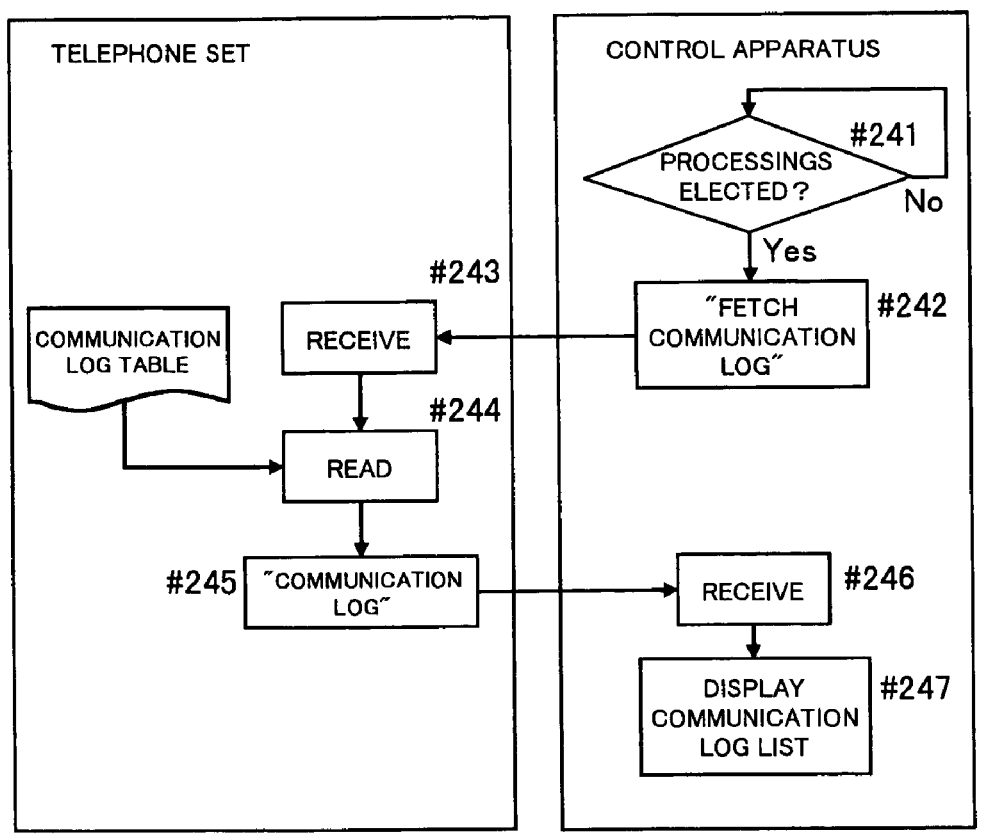
FIG. 32 is a flowchart showing the flow of operations wherein the communication log is displayed by the control apparatus.

FIG. 32 shows the flow of processing wherein the communication log is displayed by the control apparatus. First, "COMMUNICATION LOG" in the "Main Menu" and a telephone set is selected in the control apparatus. The control apparatus then sends a "RETRIEVE COMMUNICATION LOG" command (#241, 242).

The telephone set receives that command, and reads the communication log table in accordance with the command (#243, 244). The telephone set generates, based on the information that was read, a "COMMUNICATION LOG" command, and sends that command to the control apparatus (#245).

The control apparatus that receives that command analyzes the command and displays the "Communication Log List" (#246, 247).

(8) Setting of the Telephone Set (8.1) Display Screen

Figure 33:
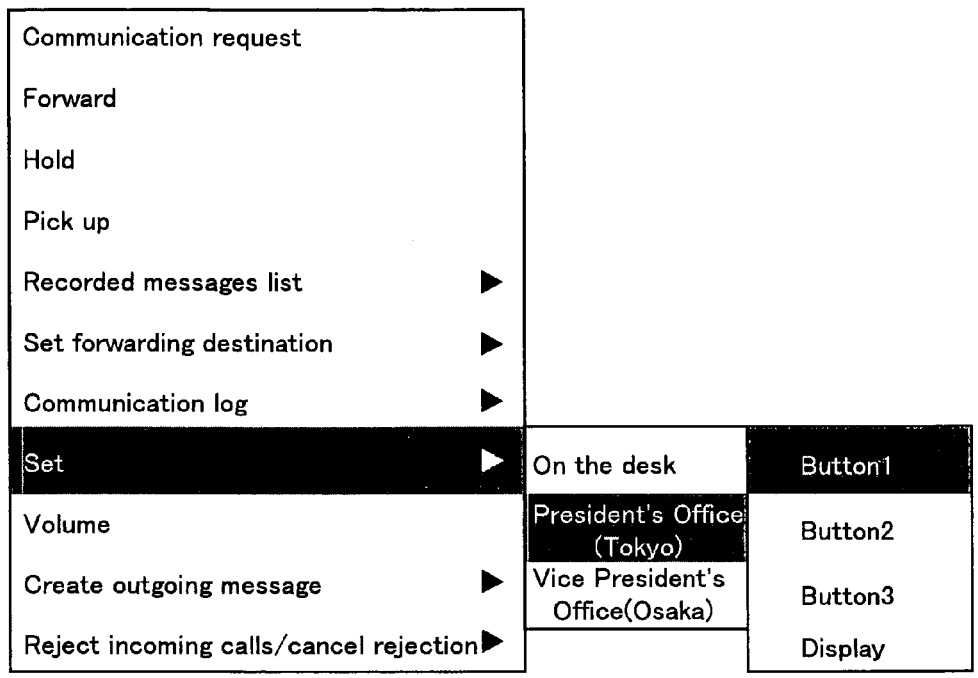
FIG. 33 shows an example of a "Button List"

The following explains the case wherein various buttons, switches and the like on the telephone set are set from the control apparatus. To simplify the explanation, the telephone set is provided beforehand with buttons 1, 2, 3 with LEDs and a display. Further, the explanation will be made for the case wherein the display status of each button of the telephone set and the display of a character message in accordance with that displays status is set by the control apparatus. If "SET" in the "Main Menu" in FIG. 14 is selected, the "Selection List" is displayed, the same as discussed earlier. If some telephone set is selected, the "Button List" shown in FIG. 33 is displayed. The settable buttons and the display of the selected telephone set are displayed in the "Button List." In FIG. 33, settable buttons 1, 2, 3 and the display in telephone set T2 in the President's Office are displayed. Furthermore, the buttons and display and the like of each telephone set are registered in, for example, the management table (FIG. 7) along with the telephone set.

Figure 34:
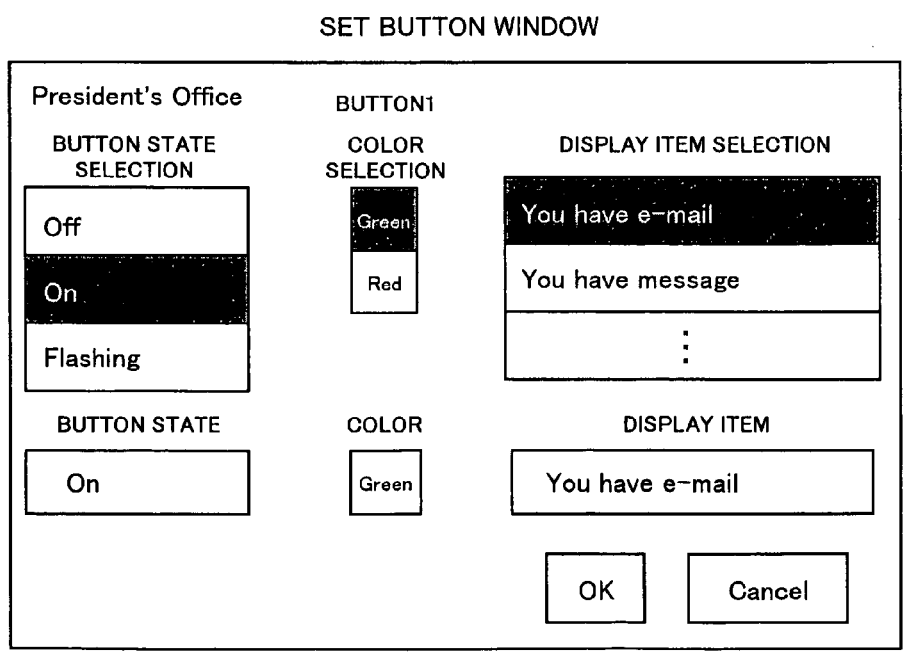
FIG. 34 shows an example of a "Set Button Window"

If some set target is selected, the "Set Button Window" shown in FIG. 34 is displayed. The "Set Button Window" receives the setting of the "Button Status," "Color" and "Display Item" corresponding to each status. The "Button Status" includes "Off," "On," "Flashing" and the like. The "Display Item" is, for example, a character message corresponding to the button status, and is displayed on the display of the telephone set. In FIG. 34, "On" is selected as the status of "Button 1." Corresponding to the "On" selection, "Green" and the character message "You have e-mail" are selected. If the user selects various items and presses the "OK" button, the "Set Button Window" closes.

(8.2) Control Command

If the "OK" button in the "Set Button Window" is pressed, a "SET" command is sent from the control apparatus to the telephone set. The telephone set analyzes the "SET" command and stores in the storage part the specified button status and character message and the like. FIG. 35 shows an example of the constitution of a "SET" command sent from the control apparatus to the telephone set. The "SET" command includes a command type, set function type, set flag, requesting party address, button identifier, display color type, display pattern, character length, display character data, result and detail.

In the present example, "0×8e" is used as the "SET" command type. A set function type of "0" indicates the setting of a button. A set flag of "0" indicates a setting, and "1" indicates a canceling. The requesting party address records the IP address of the information terminal operated by the control apparatus. A button identifier of "0" indicates green and "1" indicates red. A display pattern of "0" indicates off, "1" indicates on and "2" indicates flashing. The character length indicates the length, namely the number of bytes, of the character message displayed on the display of the telephone set. The display character data is the character message data.

(8.3) Processing for Setting the Button Status

If a "SET" command is received, the telephone set stores the set data in storage 205, and uses it thereafter in the button display. If the telephone set is instructed to display button 1, in the setting example of FIG. 34, the telephone set turns on the "Button 1" with a green color, and displays "You have e-mail."

The method for instructing the telephone set to display a button is not particularly limited. Consider the example wherein, a button and a predetermined event are associated and stored in the control apparatus. The control apparatus monitors the occurrence of the predetermined event; if the event occurs, it instructs the telephone set to display the corresponding button. The command type that instructs the display of the button and the information that specifies the button should be recorded in the control command (not shown).

(8.4) Processing in Response to a Telephone Set Button Input

Furthermore, it is also possible for the control apparatus to perform predetermined processing in response to the input of a button, function key or hook of a telephone set. In such a case, the button and predetermined processing are associated and stored in the control apparatus. The following provides an explanation using a previously discussed example. The user presses "Button 1" that is turned on. The telephone set sends to the control apparatus an "INPUT INFORMATION" command that reports that "Button 1" was pressed. If an "INPUT INFORMATION" command is received, the control apparatus performs the processing corresponding to "Button 1." Namely, it activates the e-mail reception apparatus and displays the received e-mail.

FIG. 36 shows an example of the constitution of the "INPUT INFORMATION" command. The "INPUT INFORMATION" command includes a command type, a requesting party address, input device type, result and detail. "0×01" that indicates the instruction of processing in accordance with the input device is used as the command type. The requesting party address is the address of the telephone set sending the command. An input device type of "0" indicates a telephone set dial number. Likewise, "10" indicates, for example, the automatic message recording button or auto answer button, "11" indicates the forward button, and "12" indicates a function key.

(9) Setting the Volume of the Telephone Set (9.1) Display Screen

The following explains an example of processing wherein the volume and tone of a telephone set are set from the control apparatus. If "Volume" in the "Main Menu" shown in FIG. 14 is selected, the "Set Volume" window shown in FIG. 37 is displayed. In the "Set Volume Window" of FIG. 37, the "Telephone to Be Set," "Volume" and "Tone" are set. In FIG. 37, a list of telephone sets under the management of the control apparatus is displayed, and telephone set T2 in the President's Office is selected. The volume is provided beforehand with, for example, ten steps. Examples of tones that can be selected include a gong, clock, bell, song and option. For example, if song is selected, a list of previously registered songs is displayed. In addition, if option is selected, a music staff is displayed on the screen, and a melody composed by the user can be registered. In FIG. 37, the "Bell" sound is selected as the tone. If the "OK" button is pressed, the "Set Volume Window" closes.

(9.2) Control Command

If the "OK" button in the "Set Volume Window" is pressed, a "SET SOUND" command is sent from the control apparatus to the telephone set. FIG. 38 shows an example of the constitution of the "SET SOUND" command. The "SET SOUND" command includes a command type, set function type, set flag, requesting party address, set value, coding type, tone length, tone data, result and detail. "0×8f" is used as the command type that indicates the "SET SOUND" command. This command type is also used for the "Cancel sound." A set function type of, for example, "2" indicates volume, "3" indicates tone, and "4" indicates setting of the volume and tone. A set flag of "0" indicates setting, and "1" indicates canceling. The requesting party address is the IP address of the information terminal operated by the control apparatus. The volume level set by the "Set-Sound Window"

is recorded as the set value. The coding type indicates the coding technique of the tone, the same as the recorded message discussed earlier. The byte count that indicates the length of the set tone is recorded as the tone length. The stream data of the voice data digitized by the coding type is recorded as the tone data.

The telephone set that receives the "SET SOUND" command stores predetermined data like the volume and tone data in the storage part, which are subsequently used in the output of the ring signal, and the like.

(10) Creation of Outgoing Message (Case Wherein Telephone Set has a Messages Table)

(10.1) Display Screen

Figure 39:
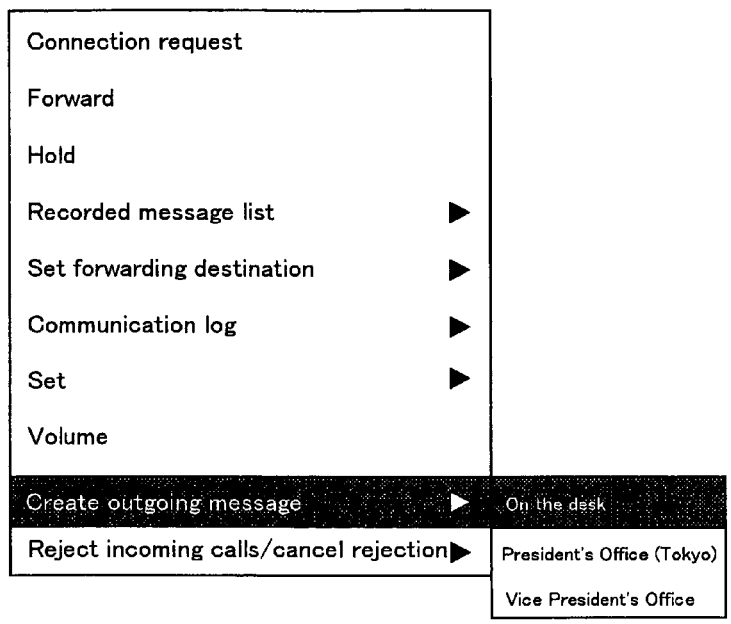
FIG. 39 shows an example of a "Create Outgoing Message Window"

The following explains an example wherein an outgoing message in accordance with the calling party is created on the information terminal, and set in the messages table of the telephone set. If "CREATE OUTGOING MESSAGE" is selected in the "Main Menu" of FIG. 14, the "Selection List" is displayed. If some telephone set is selected, the "Create Outgoing Message Window" shown in FIG. 39 is displayed. The "Create Outgoing Message Window" receives the selection of the calling party and the setting of the outgoing message to be reported to the calling party. In FIG. 39, the telephone address DB of the control apparatus is displayed as the selectable calling parties. Presently, "Hanako Fujitsu" is selected as the calling party.

The outgoing message is preferably prepared beforehand and made selectable by the user. The character data and voice data of the outgoing message is prepared beforehand. In addition, it may also be constituted so that the user can input an arbitrary message by characters or voice. In FIG. 39, the outgoing message "Absent today due to a business trip" is selected for "Hanako Fujitsu." If the "OK" button is pressed in a state wherein a calling party and an outgoing message are selected, the "Create Outgoing Message Window" closes.

(10.2) Control Command

If the "OK" button in the "Create Outgoing Message Window" is pressed, a "CREATE OUTGOING MESSAGE" command is sent from the control apparatus to the telephone set. FIG. 40 shows an example of the constitution of the "CREATE OUTGOING MESSAGE" command. The "CREATE OUTGOING MESSAGE" command includes a command type, set function type, set flag, requesting party address, calling party address, coding type, message length, message data, result and detail.

"0×80" is used as the command type that indicates the creation or cancellation of the outgoing message. In addition, a set state type of "0" indicates the creation of an outgoing message, a set flag of "0" indicates the setting of an outgoing message, and "1" indicates the cancellation of the setting. The requesting party address is the IP address of the information terminal operated by the control apparatus. The calling party address is the IP address of the calling party selected in the window. The coding type indicates the coding technique of the message data, the same as discussed earlier. The message length records the byte count of the message data. The message data is data like voice data digitized by the coding method.

(10.3) Flow of Outgoing Message Setting Processing

The telephone set that receives the "CREATE OUTGOING MESSAGE" command analyzes the command, associates the calling party and the outgoing message, and stores them in the messages table (FIG. 4). Since the processing that reports the stored outgoing message data to the calling party is the same as normal processing, a detailed explanation thereof is omitted. However, each time an incoming call request is received, the telephone set selects an outgoing message corresponding to the calling party and returns a response. If there is no corresponding outgoing message, the default outgoing message, for example, is reported.

(10.4) Case Wherein the Control Apparatus has a Messages Table

Sections (10.1) to (10.3) explained a constitution wherein the telephone set was provided with a messages table. However, a constitution is also possible wherein the control apparatus is provided with the messages table. In such a constitution, the "Create Outgoing Message Window" suffices, the same as discussed earlier. However, if the "OK" button is pressed in the "Create Outgoing. Message Window," the calling party and outgoing message are stored in the messages table of the control apparatus.

Figure 41:
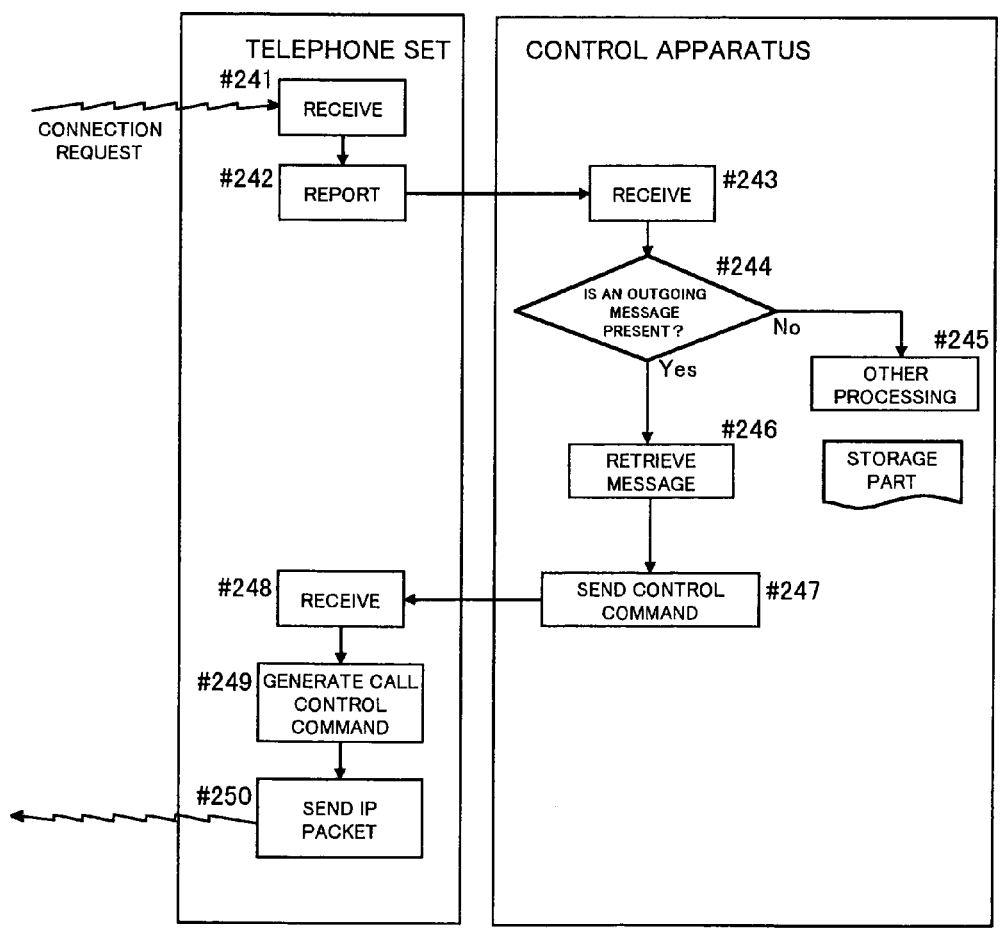
FIG. 41 is a flowchart showing the flow of operations wherein an outgoing message is reported by the control apparatus.

The following explains the processing wherein the control apparatus reports the outgoing message to the calling party. FIG. 41 shows the reporting processing for the outgoing message.

If the control apparatus receives an incoming call notification from the telephone set, it judges whether there is an outgoing message corresponding to the calling party (#241 to #244). If there is no outgoing message, the control apparatus performs other processing (#245). For example, it forwards the incoming call to the whereabouts of the user. If there is a corresponding outgoing message, the control apparatus retrieves the message and instructs the telephone set to report the outgoing message (#246, 247). This is accomplished by sending a control command (not shown) that includes a predetermined command type and the outgoing message data.

The telephone set that receives the control command reports the outgoing message to the calling party, the same as in normal processing (#248 to #250).

(11) Incoming Call Rejection and Cancellation of Rejection Processing (11.1) Display Screen The following explains the processing wherein an incoming message to a telephone set is rejected by the control apparatus, and the processing wherein the rejection is canceled. To facilitate the explanation, the rejection of an incoming call is taken as an example, but the same applies to cancellation of the rejection.

First, if "Reject Incoming Calls/Cancel Rejection" in the "Main Menu" is selected, the "Selection List" is displayed. If some telephone set is selected, the "Set/Cancel Rejection of Incoming Calls Window" shown in FIG. 42 is displayed. The "Set/Cancel Rejection of Incoming Calls Window" receives the setting or cancellation of a calling party for which incoming calls are to be rejected, and of a message to be reported. FIG. 42 shows the setting of rejecting an incoming call request from "Jiro Fujitsu." For the convenience of the user, "ALL" indicates that all calling parties may be selected as a group from the telephone address DB as the selectable calling parties.

In addition, FIG. 42 is an example wherein a message is prepared beforehand and the selection of the user is received. Of course, an arbitrary character or voice message created by the user can be received. If the "ADD" button is pressed, the calling party and added message are added to the Set List.

To cancel the setting of the rejection of incoming calls, a corresponding entry from the Set List is selected and the "Delete" button is pressed. If the "OK" button is pressed, the window closes, the added calling party address and message are associated and stored in the incoming calls rejection table (FIG. 7E). The calling party and message selected for deletion are deleted from the incoming calls rejection table.

(11.2) Flow of Processing of Incoming Calls Rejection

Figure 43:
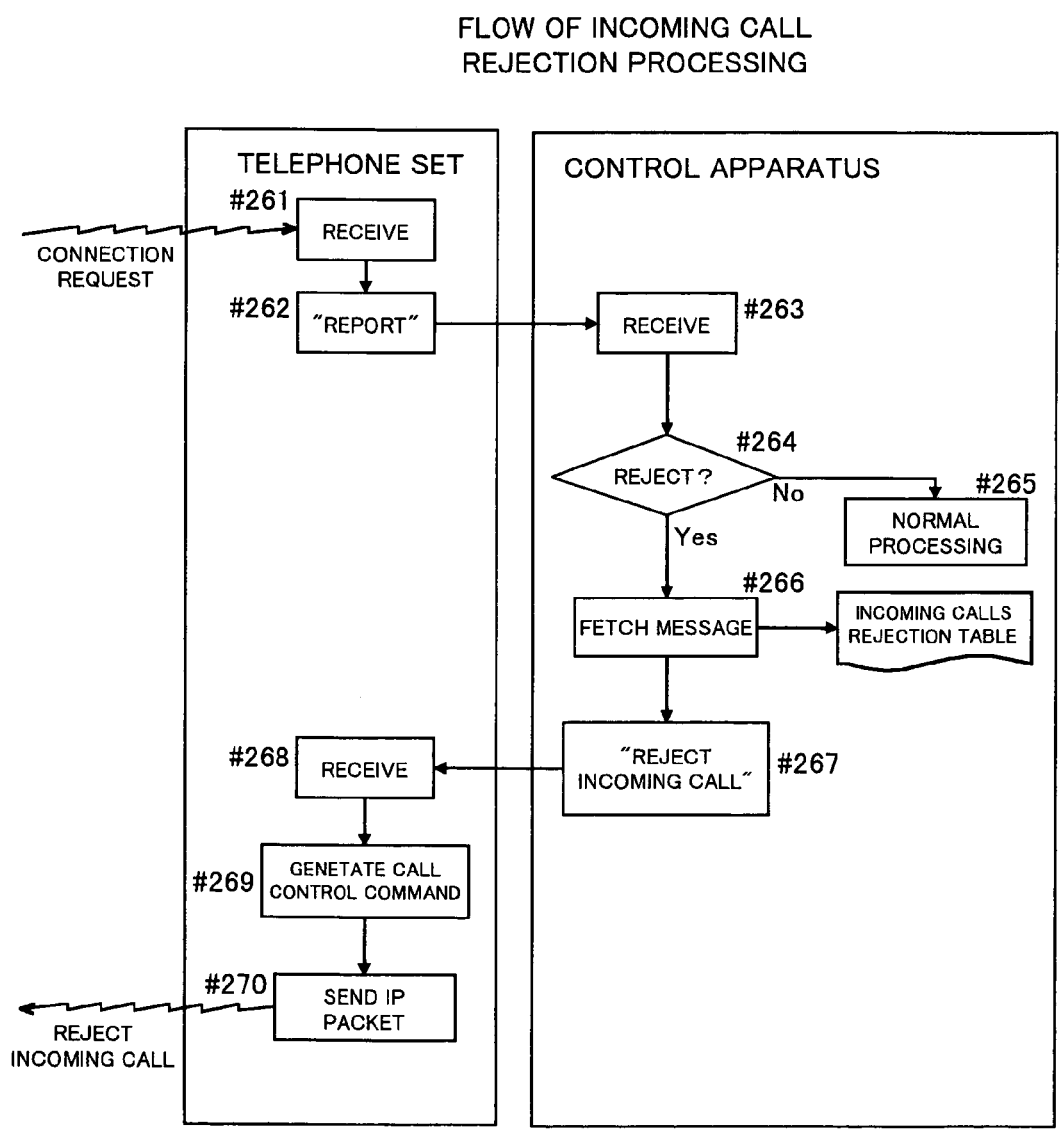
FIG. 43 is a flowchart showing the flow of operations wherein an incoming call to a telephone set is rejected by the control apparatus.

FIG. 43 shows the flow of processing of the rejection by the control apparatus of an incoming call to the telephone set. First, if there is an incoming call to the telephone set (#261), the telephone set sends a "REPORT" command to the control apparatus (#262). The control apparatus references the incoming calls rejection table, and judges whether a calling party is registered in the incoming calls rejection table (#263, 264). If "No," then the control apparatus performs normal processing. For example, in accordance with the "REPORT" command from the telephone set, the state notification window shown in FIG. 12 (a) is displayed (#265).

If "Yes," the control apparatus retrieves the message from the incoming calls rejection table (#266). The control apparatus generates, based on the retrieved message, a "Reject incoming call" command, which is discussed later, and sends that command to the telephone set (#267). The telephone set generates a call control command that includes the message, reports the message to the calling party and rejects the incoming call.

(11.3) Control Command

Figure 44:
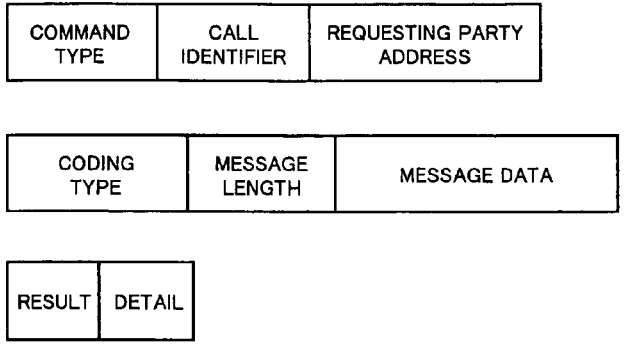
FIG. 44 shows an example of the contents of an "INCOMING CALL REJECTION AND CANCELLATION OF REJECTION" command.

FIG. 44 shows an example of the constitution of the "Reject incoming call" command and the "Cancel rejection" command sent from the control apparatus to the telephone set. Both commands include a command type, call identifier, requesting party address, coding type, message length, message data, result and detail. "0×9A" is used as the command type for "Reject incoming call," and "0×87" is used for "Cancel rejection." The message data is voice data of the message selected in the "Set Rejection of Incoming Calls Window." Other information is the same as in the control commands discussed earlier, and an explanation thereof is omitted.

(11.4) Case Wherein the Telephone Set has an Incoming Calls Rejection Table

Sections (11.1) to (11.3) explain a constitution wherein the control apparatus is provided with the incoming calls rejection table. However, a constitution is also possible wherein the telephone set is provided with the incoming calls rejection table. In this constitution as well, the "Set/Cancel Rejection of Incoming Calls Window" is sufficient, the same as discussed earlier. However, if the "OK" button in the "Set/Cancel Rejection of Incoming Calls Window" is pressed, a predetermined control command is sent from the control apparatus to the telephone set. The telephone set analyzes the received control command, and stores the calling party address and message in the incoming calls rejection table.

The constitution of the control command sent from the control apparatus to the telephone set is the same as the "CREATE OUTGOING MESSAGE" command, and is therefore omitted from the drawings.

In addition, the processing wherein an incoming call is rejected and a message is reported to a stored calling party is the same as normal processing, and a detailed explanation thereof is therefore omitted. However, every time an incoming call request is received, the telephone set selects a message corresponding to the calling party, and reports that message. If a corresponding message is not set, a default message, for example, is reported.

(12) Other (12.1) Authentication Processing

To make it so that the telephone set receives only control commands from the control apparatuses on a terminal list, we can consider performing authentication processing of the control command by the telephone set.

In the present mode for carrying out the present invention, the authentication information for specifying the control apparatus is associated with the control apparatus and stored in the terminal table of the telephone set (FIG. 3). Authentication information is also provided by some method in each control apparatus. For example, the input of a user ID and personal identification number may be requested when activating the control apparatus.

Information that specifies the user operating the control apparatus is used as the authentication information. The user ID and personal identification number are used as information that specifies the user. The user ID and personal identification number are recorded in the control command sent from the control apparatus to the telephone set. The telephone set that receives the control command compares the user ID and personal identification number included in the control command with the user ID and personal identification number in the terminal table. The telephone set authenticates the control command based on the comparison result.

(12.2) Processing for Recording Notification

In Section (10), an outgoing message is sent to the calling party every time there is an incoming call to the telephone set. Subsequently, there may be a case wherein a recorded message is sent from the calling party to the telephone set. The following explains the processing of reporting a recording, wherein the control apparatus is provided with a recorded messages table, and a recorded message is stored in the recorded messages table of the control apparatus. To simplify the explanation, the processing after the outgoing message is sent from the telephone set in Section (10.4) will be explained (not shown).

If a recorded message is received from a calling party, the telephone set generates a "Recording notification" command. The received voice stream data is recorded in the "Recording notification" command in its compressed format as is. In addition, the voice stream data may be decompressed, converted to digital data based on the PCM (Pulse Code Modulation) technique, and recorded in the "Recording notification" command.

The control apparatus analyzes the received command, and stores the recorded message in the recorded messages table. If the recorded message is divided into a plurality of commands, the control apparatus stores the divided message in one file. The storage format may be the stream data format, but is preferably converted to a format outputtable by the output part in order to facilitate replay of the recorded message. By recording the voice data in the control apparatus, the telephone set does not require a large amount of memory, and it is easier to make the telephone set lower cost and more compact.

The following explains the "Recording notification" command (not shown) sent from the telephone set to the control apparatus. The "Recording notification" command includes, for example, a command type, call identifier, requesting party address, message number, coding type, message length, message data, result and detail. "0×20," for example, is used as the command type that indicates "Recording notification." Other information is the same as discussed earlier, and the explanation thereof is not repeated.

(12.3) Processing of Recording the Telephone Call Conversation

The following explains the processing wherein, if there is a telephone call conversation between one telephone set and another telephone set, the conversation is sent to the control apparatus and recorded.

The method of starting transmission of the conversation is not particularly limited. Consider the case wherein the telephone set is provided with a "Telephone call recording" button. Transmission of the conversation from the telephone set to the control apparatus starts if this button is pressed. Alternatively, transmission of the conversation starts if the handset is lifted. Alternatively, a predetermined control command that instructs the start of transmission of the conversation is sent from the control apparatus, and the transmission of the conversation is started based on this instruction.

The conversation can be sent by a control command having a constitution the same as the "Recording notification" command discussed earlier. The transmission method and storage format of the voice stream data are also the same as in the recording notification processing, and an explanation thereof is therefore omitted.

(13) Display the Operation Panel of the Telephone Set on the Display of the Control Apparatus (13.1) Control of the Telephone Set Sections (3) to (11) explained a case wherein control of the telephone set was performed from a window corresponding to each item in the main menu. However, it is also possible to display the operation panel of the telephone set on the display of the control apparatus, and to perform operations on the control apparatus the same as those performed on the telephone set.

Figure 45:
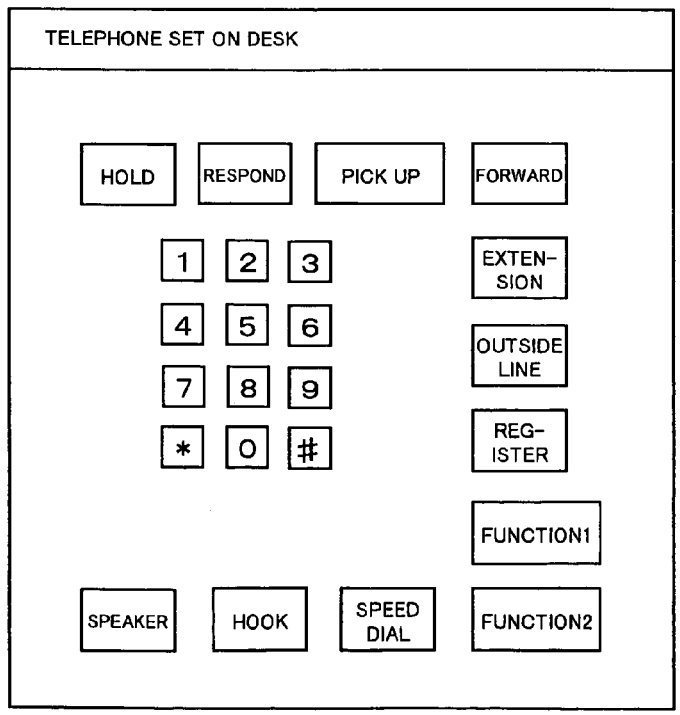
FIG. 45 shows an example of the operation panel window of the telephone set displayed by the control apparatus.

For example, in place of the "Main Menu," the control apparatus displays on the display the "Main Menu" as well as icons (not shown) that indicate the telephone sets under its control. If the icon of some telephone set is selected, the control apparatus displays the "Operation Panel Window" shown in FIG. 45. This window shows the operation panel of the selected telephone set. For example, if the "Hook" button and the telephone number "06-6123-4567", in FIG. 45 are pressed, an "Input" command that reports the pressed buttons is sent to the selected telephone set.

FIG. 49 shows one example of the organization and contents of the input command. The "INPUT" command includes a command type, requesting part address, an input number, an input device type, result and detail. "0×21" is used as the command type that indicates the "INPUT" command. The requesting party address is the address of a control apparatus. The Input Number is the number of following input device types. An identifier corresponding to each button is recorded in input device type in order to report that a button was pressed. An input device type is preset for each button of the telephone set. For example, an input of the "Hook" button is reported as "0×15," an input of the number "0" is reported as "0×30," and the like. Input device types may also be combined commensurate with the number of pressed buttons. For example, if two input devices are designated and sent in one command, there would be two input numbers, such as "0×15" and "0×30", reported.

Thus, by making the buttons of the telephone set individually executable commands, operations that can be performed by the telephone set can be performed by the control apparatus. Furthermore, operation is facilitated by making it possible to input the telephone number by the numeric keys in addition to inputting it by the screen.

(13.2) Report Button Command Sent from a Telephone Set to a Control Apparatus

To display the operation panel of each telephone set, as discussed earlier, in the control apparatus, the telephone set's input devices, such as the various buttons, must be reported to the control apparatus beforehand. Furthermore, to report the input devices, a "REPORT INPUT DEVICES" command is provided, and is sent from the telephone set to the control apparatus. One possibility for the timing in which this command is sent is, for example, when the telephone set is registered in the control apparatus.

Figure 46:
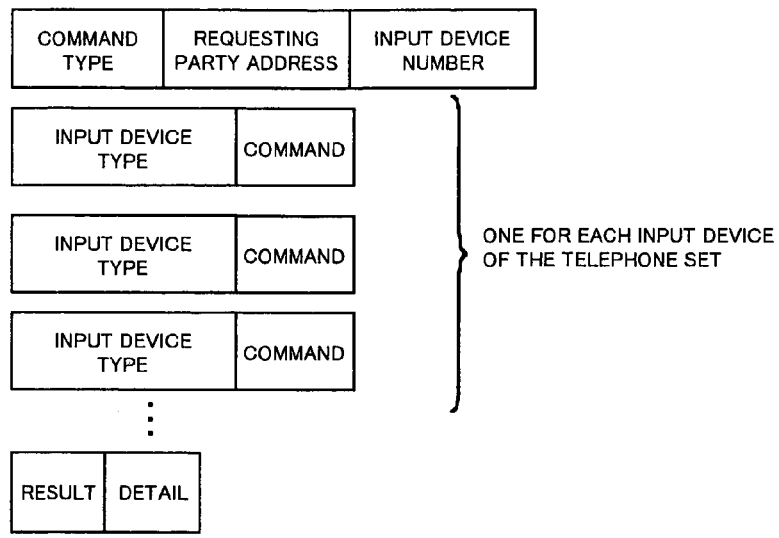
FIG. 46 shows an example of the contents of a "REPORT INPUT DEVICES" command.

FIG. 46 shows an example of the constitution of the "REPORT INPUT DEVICES" command. The "REPORT INPUT DEVICES" command includes a command type, requesting party address, input device number, input device type, command, result and detail. Among these, the input device type and command are repeated commensurate with the number indicated by the input device number of the telephone set. The requesting party address is the address of the telephone set sending the command. The input device type indicates the number of the input device type. Identification information for specifying a button and the like is recorded in the input device type. A command type used when reporting that a device specified by the input device type has been pressed is recorded in the command. Examples of input device types and commands include an input device type of "HK" and a command of "0×15" for the "Hook" button, and an input device type of "0" and a command of "0×30" for the number "0".

The control apparatus that receives the "REPORT INPUT DEVICES" command associates the input device type and command, and stores them in the management table shown in FIG. 7A.

By the telephone set reporting the input devices to the control apparatus, it is possible to perform control corresponding to function buttons that differ for each telephone set.

(13.3) Another Example of State Notification Processing

Section (1) explained an example wherein the communication state of the telephone set when the communication state changed was reported to the control apparatus. However, the timing when the state is reported to the control apparatus is not limited to the example previously discussed. Consider the example wherein a telephone set is continuously activated and the power supply of the control apparatus frequently turns on and off. Consequently, it is conceivable that the control apparatus will not know the communication state of the telephone sets under its management when the control apparatus is activated.

Furthermore, consider the example wherein, when the control apparatus is activated, a control command that requests reporting of the communication state is sent to the telephone set. The telephone set analyzes the control command, and sends the communication state notification to the control apparatus. If a control command is received, the control apparatus displays the "State Notification Window" and writes the communication state to the communication state table shown in FIG. 7C.

Figure 47:
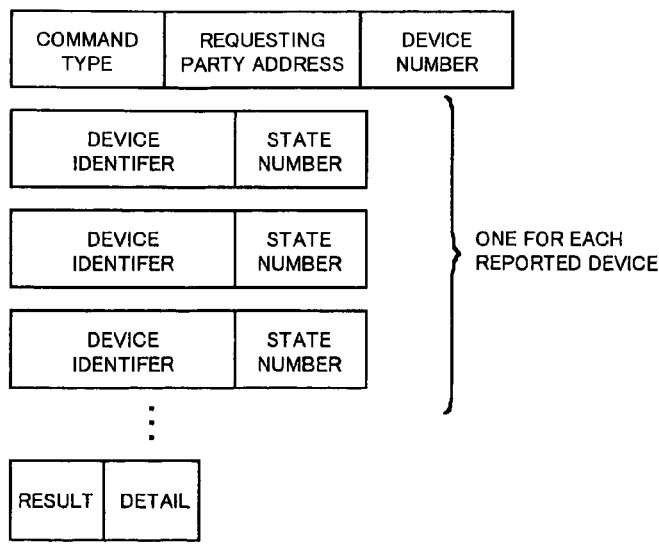
FIG. 47 shows an example of the contents of a "COMMUNICATION STATE NOTIFICATION" command.

FIG. 47 shows the constitution of the "COMMUNICATION STATE NOTIFICATION" command wherein the telephone set reports the communication state to the control apparatus. The "COMMUNICATION STATE NOTIFICATION" command includes a command type, requesting party address, a device number, device identifier, state number, result and detail. Among these, there may be multiples of the device identifier and the state number depending upon the number of each designated. "0×34" is used as the command type. The requesting party address is the address of the telephone set sending the command. A device number a number designated devices (corresponding to the device identifier and state number). The device identifier is the identifier for indicating which device the state notification is for. For example, a call state is "0×01," a "Button 1" state is "0×31" and a "Lamp 1" state is "0×51." The state number is different for each device. For a call, for example, "Free" is "0×00," and incoming call in progress is "0×01." In addition, for "Button 1," "On" is "0×01," and "Off" is "0×00." If a "COMMUNICATION STATE NOTIFICATION" command is received, the control apparatus can reflect the state of the reported button in the "Operation Panel Window."

(13.4) Setting a Plurality of Telephone Sets

Sections (8.1) to (8.3) explained a case wherein some setting was performed from the control apparatus for the input devices of one telephone set. However, the control apparatus can also set a plurality of telephone sets. Consider the example wherein a multi-cast address or a broadcast address is used as the send destination of an "Input" command. Thereby, the "Input" command is sent simultaneously to a plurality of telephone sets. Of course, the control command may also be sent sequentially to the plurality of telephone sets.

SECOND EMBODIMENT FOR CARRYING OUT THE PRESENT INVENTION

Figure 48:
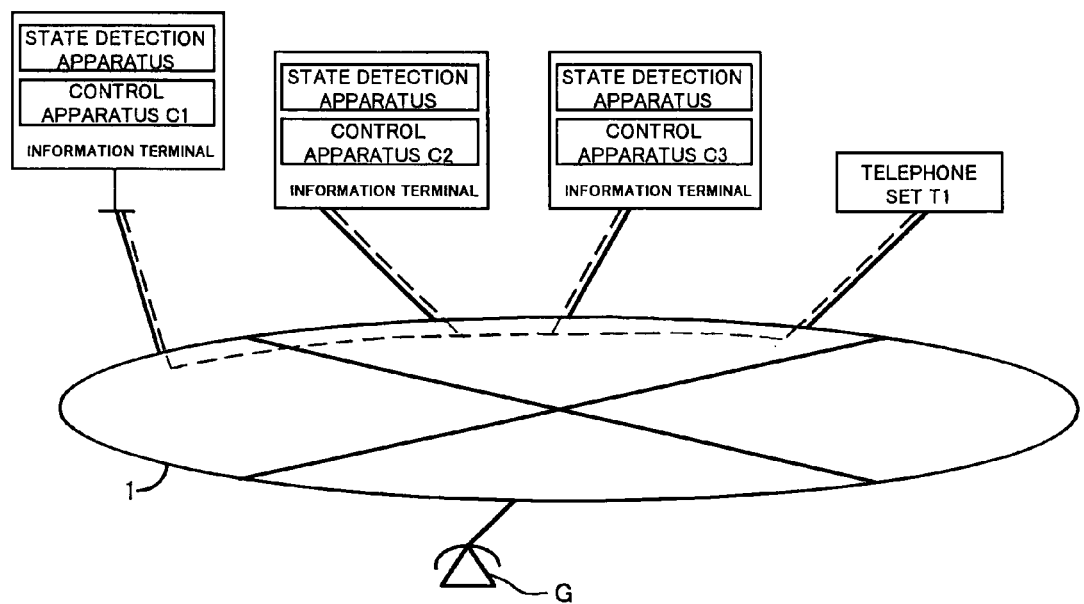
FIG. 48 shows an overview of a media communication control system according to a second embodiment of the present invention.

The first mode for carrying out the present invention describes a constitution wherein one control apparatus manages a plurality of telephone sets, but we can also conceive of a constitution wherein a plurality of control apparatuses share and manage a telephone set. FIG. 48 shows the overall constitution of a media communication control system according to the second mode for carrying out the present invention. In this system, a plurality of control apparatuses C1, C2, C3 share and control telephone set T1.

The constitution of the control apparatus and the telephone set are the same as in the first mode for carrying out the present invention. The flow of processing of control commands sent between the control apparatus and the telephone set are also the same as in the first mode for carrying out the present invention.

However, the addresses of the plurality of control apparatuses, and the like are registered in the terminal table of the telephone set. If there is a plurality of control commands in response to a control command from the telephone set, the method of selecting the control command is not particularly limited. For example, we can consider performing processing in accordance with the control command sent earliest. In addition, it is conceivable to assign a priority to control apparatuses. Then, the telephone set receives control commands in a predetermined time, and performs processing in accordance with the command having the highest priority among the control commands received within that time.

OTHER MODE FOR CARRYING OUT THE PRESENT INVENTION (A) The present invention may be stored in a recording medium as a computer software program that executes the method of the present invention described above. Such recording medium includes a floppy disc that a computer can read and write, a hard disc, semiconductor memory, a CD-ROM, a DVD, a laser magnetic disk (MO), and other things.

(B) The present invention also be in the form of a carrier wave transmitted along transmission medium wherein the methods described above occur on along the transmission medium. Such transmission medium includes communication mediums such as optical fiber, wireless circuit, infrared rays, and others, on a computer network (LAN, Internet, wireless communication network) system for transferring and providing program information in the form of a carrier wave.

EFFECTS OF THE INVENTION

Use of the present invention can facilitate control of a telephone set, and therefore simplifies the provision of various services without newly providing a modem, built-in circuit board and the like.

What is claimed is:

1. A packet-switched network phone communication control method, comprising:
   providing a packet-switched phone controller having a first packet-switched input/output interface;
   providing a packet-switched phone having a second packet-switched input/output interface and directly communicably connectable via a packet-switched network with the packet-switched phone controller via the respective first and second packet-switched input/output interfaces;
   sending from the packet-switched phone controller to the packet-switched phone a control command for a packet-switched network phone call function on said packet switched network and a packet-switched phone function control command, and
   controlling from the packet-switched phone, the packet-switched network phone call function with another packet-switched phone on the packet-switched network and the packet-switched phone function, according to the call function control command and the packet-switched phone function control command from the packet-switched phone controller.

2. A packet-switched network multimedia phone communication control system comprising:
   a packet-switched phone controller having a first packet-switched input/output interface;
   a packet-switched phone having a second packet-switched input/output interface and directly communicably connectable via a packet-switched network with the packet-switched phone controller via the respective first and second packet-switched input/output interfaces, wherein
   said packet-switched phone controller generates a control command based on an instruction from a user, the control command including an instruction related to a packet-switched network multimedia phone call function on said packet-switched network and related to a packet-switched phone function control of said packet-switched phone, and said packet-switched phone controller sends the instruction to said packet-switched phone, and said packet-switched phone controls the packet-switched network multimedia phone call function with another packet-switched phone on the packet-switched network and the packet-switched phone function, according to the call function control command and the packet-switched phone function control command from said packet-switched phone controller.

3. A computer readable recording medium whereon is stored a packet-switched network multimedia phone communication control program to control a packet-switched phone, which is directly communicably connectable on a packet switched network with a packet-switched phone controller, via packet-switched input/output interfaces in the packet-switched phone and the packet-switched phone controller, respectively, according to a process comprising:

receiving from the packet-switched phone controller on the packet switched network a control command that includes an instruction related to a packet-switched network multimedia phone call function on said packet-switched network and related to a packet-switched phone function control of the packet-switched phone; and performing the instruction received in the control command, the instruction including control of the packet-switched network multimedia phone call function with another packet-switched phone on the packet-switched network and the packet-switched phone function.

4. A packet-switched network multimedia phone communication control method for use in a packet-switched communication system that includes a plurality of packet-switched phones that are directly communicably connectable on the packet switched communication system with a packet-switched phone controller, via packet switched input/output interfaces in the packet-switched phone and the packet-switched phone controller, respectively, the method comprising:

sending from said packet-switched phone controller to one of said packet-switched phones an instruction related to a packet-switched network multimedia phone call function on said packet switched communication system and related to a packet-switched phone function control of the one packet-switched phone, and performing in said one packet-switched phone, the packet-switched network multimedia phone call function with another packet-switched phone on said packet switched communication system and the packet-switched phone function, according to the instruction from said packet-switched phone controller.

5. A packet-switched network multimedia phone communication control system comprising:

a plurality of packet-switched phones that are directly communicably connectable by a packet switched network with a packet-switched phone controller, via packet switched input/output interfaces in the packet-switched phone and the packet-switched phone controller, respectively, wherein said packet-switched phone controller includes a control target list having information identifying at least one of said packet-switched phones, a terminal controller generating, based on an instruction from a user, a control command that includes an instruction related to a packet-switched network multimedia phone call function and related to a packet-switched phone function control of one of said packet-switched phones, and transmitting the control command to one of said packet-switched phones; and each packet-switched phone includes a terminal list including information relating to said packet-switched phone controller, and a phone controller performing, based on the control command received from said packet-switched phone controller, the packet-switched network multimedia phone call function with another packet-switched phone on said packet switched network and the packet-switched phone function.

6. The packet-switched network multimedia phone communication control system according to claim 5, wherein said phone controller of each packet-switched phone further generates a control command that reports a state of the packet-switched network multimedia phone call function with said another packet-switched phone on said packet switched network, and sends said packet-switched network multimedia phone call function state control command to said packet-switched phone controller.

7. The packet-switched network multimedia phone communication control system according to claim 6, wherein said terminal controller of said packet-switched phone controller further generates a control command that, in response to the packet-switched network multimedia phone call function state control command sent from said packet-switched phone, instructs processing related to the packet-switched network multimedia phone call function.

8. The packet-switched network multimedia phone communication control system according to claim 7, wherein identification of the plurality of packet-switched phones are stored in the terminal list of each packet-switched phone, and each phone controller of the packet-switched phones performs the packet-switched network multimedia phone call function with another packet-switched phone according to a first received packet-switched network multimedia phone call function control command from among a plurality of packet-switched network multimedia phone call function control commands sent from said packet-switched phone controller in response to the reporting of the packet-switched network multimedia phone call function state by the phone controller of each packet-switched phone.

9. The packet-switched network multimedia phone communication control system according to claim 5, wherein each packet-switched phone further has a data storage storing packet-switched network phone call messages, said terminal controller of said packet-switched phone controller further generates a control command that instructs retrieval of the phone call message data stored in said packet-switched phones, and each phone controller of each packet-switched phone acquires, based on said retrieval control command, said phone call message data from said data storage, further generates a control command including said acquired phone call message data, and sends said acquired phone call message data control command to said packet-switched phone controller.

10. The packet-switched network multimedia phone communication control system according to claim 9, wherein said packet-switched phone controller further has an output unit that outputs the retrieved phone call message data according to the acquired phone call message data control command sent from said packet-switched phones.

11. The packet-switched network multimedia phone communication control system according to claim 5, wherein each packet-switched phone further comprises a data storage, said terminal controller of said packet-switched phone controller further generates a control command that instructs packet-switched network phone call message data to be stored in said packet-switched phones data storages, and said phone controller of each packet-switched phone stores said phone call message data in said data storage based on said phone call message data store control command.

12. The packet-switched network multimedia phone communication control system according to claim 11, wherein a display unit is provided in said packet-switched phones, said terminal controller of said packet-switched phone controller generates, based on an instruction from the user, a control command that instructs said display unit of the packet-switched phones to display a pattern, and said phone controller of each packet-switched phone stores, based on said display control command, the display pattern associated with said display unit in said data storage, and displays said display pattern on said display unit.

13. The packet-switched network multimedia phone communication control system according to claim 5, wherein said packet-switched phone controller further comprises a processing specifying unit that receives specification of a predetermined processing related to the packet-switched network multimedia phone call function, and reports the predetermined processing to the terminal controller of the packet-switched phone controller.

14. The packet-switched network multimedia phone communication control system according to claim 13, wherein said packet-switched phone controller further has a packet-switched phone specifying unit that receives identification of one of the packet-switched phones stored in said control target list, and reports the identification of the one packet-switched phone to the terminal controller of the packet-switched phone controller.

15. The packet-switched network multimedia phone communication control system according to claim 5, wherein identification of the plurality of said packet-switched phones are stored in the control target list of said packet-switched phone controller.

16. The packet-switched network multimedia phone communication control system according to claim 5, wherein identification of the plurality of said packet-switched phones are stored in the terminal list of each packet-switched phone.

17. A multimedia phone communication control system comprising:

a plurality of packet-switched phones and an information terminal connected by a packet switched network, wherein the information terminal comprises:

a data storage storing a control target list identifying at least one of the packet-switched phones, a packet-switched phone state detector that detects a state of a packet-switched phone user, and a terminal controller transmitting, based on an instruction from a terminal user, a multimedia phone communication control command and a control command that instructs a predetermined multimedia phone communication processing according to a state of the multimedia phone communication and the detected state of the packet-switched phone user, to one of the packet-switched phones; and each packet-switched phone comprises:

a data storage storing a terminal list including information relating to the information terminal, and a phone controller performing, based on the multimedia phone communication control command from said information terminal, the multimedia phone communication with another packet-switched phone on the packet switched network, and transmitting a control command that reports the state of the multimedia phone communication with another packet-switched phone to the information terminal.

18. A multimedia phone communication control system comprising:

a plurality of packet-switched phones and an information terminal connected by a packet switched network, wherein the information terminal comprises:

a data storage storing a control target list identifying at least one of the packet-switched phones, and a terminal controller transmitting, based on an instruction from a terminal user, a multimedia phone communication control command and a control command that instructs a predetermined multimedia phone communication processing according to a state of the multimedia phone communication, to one of the packet-switched phones; and each packet-switched phone comprising:

a data storage storing a terminal list including identification of the plurality of packet-switched phones and a priority of each packet-switched phone, and a phone controller transmitting a control command, that reports the state of the multimedia phone communication, to the information terminal and performing the multimedia phone communication with another packet-switched phone on the packet switched network according to the multimedia phone communication control command having a highest priority from among a plurality of multimedia phone communication control commands transmitted from said information terminal in response to the multimedia phone communication state control command reporting of the multimedia phone communication state by the phone controller.

19. A multimedia phone communication control system, comprising:

a plurality of packet-switched phones and an information terminal connected by a packet switched network, wherein the information terminal comprises:

a data storage storing a control target list identifying at least one of the packet-switched phones, a terminal controller transmitting, based on an instruction from a terminal user, a multimedia phone communication control command and a recorded message information retrieval control command, to one of the packet-switched phone, and an output unit that outputs a retrieved recorded message information according to a retrieved recorded message information control command sent from the one packet-switched phone; and each packet-switched phone comprises:

a data storage storing a terminal list including information relating to the information terminal, and storing recorded message information related to a recorded message from another packet-switched phone, and a phone controller performing, based on the multimedia phone communication control command received from said information terminal, the multimedia phone communication with another packet-switched phone on the packet switched network, and transmitting, based on said recorded message information retrieval control command, a control command including said recorded message information stored in the data storage of the packet-switched phone, to the information terminal.

20. A multimedia phone communication control system, comprising:
a plurality of packet-switched phones and an information terminal connected by a packet switched network, wherein
the information terminal comprises:
a data storage storing a control target list identifying at least one of the packet-switched phones,
a terminal controller transmitting, based on an instruction from a terminal user, a multimedia phone communication control command and a specified recorded message retrieval control command, to one of the packet-switched phones, and
an output unit that outputs a retrieved specified recorded message according to a retrieved recorded message control command sent from the one packet-switched phone; and
each packet-switched phone comprises:
a data storage storing a terminal list including information relating to the information terminal, and storing a recorded message from another packet-switched phone, and
a phone controller performing, based on the multimedia phone communication control command from said information terminal, the multimedia phone communication with another packet-switched phone on the packet switched network, and transmitting, based on said specified recorded message retrieval control command, a control command that includes the specified recorded message stored in the data storage of the packet-switched phone, to the information terminal.

21. A multimedia phone communication control system, comprising:
a plurality of packet-switched phones and an information terminal connected by a packet switched network, wherein
the information terminal comprises:
a data storage storing a control target list identifying at least one of the packet-switched phones, and
a terminal controller transmitting, based on an instruction from a terminal user, a multimedia phone communication control command and a specified recorded message output control command, to one of the packet-switched phones; and
each packet-switched phone comprises:
a data storage storing a terminal list including information relating to the information terminal, and storing a recorded message from another packet-switched phone, and
a phone controller performing, based on the multimedia phone communication control command from said information terminal, the multimedia phone communication with another packet-switched phone on the packet switched network, and outputting, based on said specified recorded message output control command, the specified recorded message stored in the data storage of the packet-switched phone.

22. A multimedia communication control system, comprising:
a plurality of packet-switched phones and an information terminal connected by a packet switched network, wherein
the information terminal comprises:
a data storage storing a control target list identifying at least one of the packet-switched phones,
a terminal controller transmitting, based on an instruction from a terminal user, a multimedia phone communication control command and a communication log retrieval control command, to one of the packet-switched phones, and
an output unit that outputs a retrieved communication log according to a retrieved communication log control command sent from the one packet-switched phone; and
each packet-switched phone comprises:
a data storage storing a terminal list including information relating to the information terminal, and storing a communication log, and
a phone controller performing, based on the multimedia phone communication control command from said information terminal, the multimedia phone communication with another packet-switched phone on the packet switched network, and transmitting, based on said communication log retrieval control command, the retrieved communication log control command that includes said communication log stored in the data storage of the packet-switched phone.

23. A multimedia phone communication control system, comprising:
a plurality of packet-switched phones and an information terminal connected by a packet switched network, wherein
the information terminal comprises:
a data storage storing a control target list identifying at least one of the packet-switched phones, and
a terminal controller transmitting, based on an instruction from a terminal user, a multimedia phone communication control command and a message storage control command, to one of the packet-switched phones; and
each packet-switched phone comprises:
a data storage storing a terminal list including information relating to the information terminal, and
a phone controller performing, based on the multimedia phone communication control command from said information terminal, the multimedia phone communication with another packet-switched phone on the packet switched network, and storing, based on the message storage control command, the message in the data storage, and reporting storage of the stored message to another packet-switched phone.

24. A multimedia phone communication control system, comprising:
a plurality of packet-switched phones and an information terminal connected by a packet switched network, wherein
the information terminal comprises:
a data storage storing a control target list identifying at least one of the packet-switched phones, and
a terminal controller transmitting, based on an instruction from a terminal user, a multimedia phone communication control command and a forward destination setting control command, to one of the packet-switched phones; and each packet-switched phone comprises:
a data storage storing a terminal list including information relating to the information terminal, and
a phone controller performing, based on the multimedia phone communication control command from said information terminal, the multimedia phone communication with another packet-switched phone on the packet switched network, storing, based on said forward destination setting control command, the forwarding destination setting in the data storage of the packet-switched phone, and reporting the forwarding destination setting to another packet-switched phone in a predetermined case.

25. A multimedia communication control system, comprising:
a plurality of packet-switched phones and an information terminal connected by a packet switched network, wherein
the information terminal comprises:
a data storage storing a control target list identifying at least one of the packet-switched phones and a processing table that associates an input unit of a packet-switched phone with a predetermined processing, and
a terminal controller transmitting, based on an instruction from a terminal user, a multimedia phone communication control command, and referencing the processing table based on an input occurrence report control command and performing a processing corresponding to the input unit with the input occurrence; and
each packet-switched phone comprises:
a data storage storing a terminal list including information relating to the information terminal,
an input unit, and
a phone controller performing, based on the multimedia phone communication control command from said information terminal, the multimedia phone communication with another packet-switched phone on the packet switched network, and transmitting the input occurrence report control command, based upon an input to the input unit, to the information terminal.

26. A multimedia phone communication control system, comprising:
a plurality of packet-switched phones and an information terminal connected by a packet switched network, wherein
the information terminal comprises:
a data storage storing a control target list identifying at least one of the packet-switched phones, and
a terminal controller transmitting, based on an instruction from a terminal user, a multimedia phone communication control command and authentication information; and
each packet-switched phone comprises:
a data storage storing a terminal list including information relating to the information terminal and authentication information associated with the information terminal, and
a phone controller performing, based on the multimedia phone communication control command from the information terminal, the multimedia phone communication with another packet-switched phone on the packet-switched network and comparing the authentication information included in the multimedia phone communication control command and the authentication information of the terminal list to authenticate the information terminal.

27. A packet-switched network multimedia phone on packet switched network, comprising:
a terminal list storing information relating to a predetermined packet-switched phone controller that is directly communicably connectable with the packet-switched network multimedia phone on said packet switched network via packet-switched input/output interfaces in the packet-switched phone and the packet-switched phone controller, respectively, and
a controller using the terminal list and receiving from said predetermined packet-switched phone controller, a packet-switched network multimedia phone call function control command and a packet-switched phone function control command, and performing, based on said packet-switched network multimedia phone call function control command and the packet-switched phone function control command, the packet-switched network multimedia phone function call with another packet switched phone on said packet switched network and the packet-switched phone function.

28. A computer readable recording medium whereon is recorded a packet-switched network multimedia phone communication control program to control a packet-switched phone, which is directly communicably connectable on a packet switched network with a packet-switched phone controller, via packet-switched input/output interfaces in the packet-switched phone and the packet-switched phone controller, respectively, according to a process comprising:
storing information relating to the packet-switched phone controller on said packet switched network;
receiving from said packet-switched phone controller a packet-switched network multimedia phone call function control command and a packet-switched phone function control command; and
performing according to the stored information of the packet-switched phone controller and, based on said packet-switched network multimedia phone call function control command and the packet-switched phone function control command, the packet-switched network multimedia phone call function with another packet-switched phone on said packet switched network and the packet-switched phone function.

29. A packet-switched network multimedia phone communication control method used in a packet-switched multimedia phone communication system having a packet-switched phone that is directly communicably connectable on a packet switched network with a packet-switched phone controller via packet-switched input/output interfaces in the packet-switched phone and the packet-switched phone controller, respectively, the method comprising:
reporting from said packet-switched phone to said packet-switched phone controller an instruction from a use of the packet-switched phone,
generating by said packet-switched phone a response to a packet-switched network multimedia phone call function control command and a packet-switched phone function control command from said packet-switched phone controller, and/or an event of the packet-switched network multimedia phone call function with a communicating party of the packet-switched network multimedia phone call function, and
controlling from packet-switched phone controller, a packet-switched network multimedia phone call function and a packet-switched phone function according to the reporting and/or the generated event from said packet switched phone.

30. A computer readable recording medium whereon is recorded a packet-switched network multimedia phone communication control program to control a packet-switched phone, which is directly communicably connectable on a packet switched network with a packet-switched phone controller via packet-switched input/output interfaces in the packet-switched phone and the packet-switched phone controller, respectively, according to a process comprising:

generating, based on an instruction from a user of the packet-switched phone, a response control command in response to a control command from said packet-switched phone controller, the response control command reporting information regarding a packet-switched network multimedia phone call function, and/or an event of the packet-switched network multimedia phone call function with a communicating party of the packet-switched network multimedia phone call function; and transmitting the response control command to the packet-switched phone controller on said packet switched network.

31. A computer readable recording medium whereon is recorded a packet-switched network multimedia phone communication control program to control a packet-switched phone controller, which is directly communicably connectable on a packet switched network with a packet-switched phone via packet-switched input/output interfaces in the packet-switched phone and the packet-switched phone controller, respectively, according to a process comprising:

receiving from the packet-switched phone, a response control command in response to a control command from said packet-switched phone controller, the response control command including information related to a packet-switched network multimedia phone call function and a packet-switched phone function, and/or an event of the packet-switched network multimedia phone call function with a communicating party of the packet-switched network multimedia phone call function on packet switched network; and controlling, based on the response control command, the packet-switched network multimedia phone call function and/or the phone function of said packet switched network.

* * * * *

UNITED STATES PATENT AND TRADEMARK OFFICE
CERTIFICATE OF CORRECTION

| | |
|---|---|
| PATENT NO. | : 7,061,902 B1 |
| APPLICATION NO. | : 09/520810 |
| DATED | : June 13, 2006 |
| INVENTOR(S) | : Noriyuki Fukuyama et al. |

It is certified that error appears in the above-identified patent and that said Letters Patent is hereby corrected as shown below:

Column 49, line 3, change "packet switched" to --packet-switched--

Signed and Sealed this

Sixth Day of March, 2007

JON W. DUDAS
*Director of the United States Patent and Trademark Office*